(12) United States Patent
Kazaryan et al.

(10) Patent No.: US 8,597,996 B1
(45) Date of Patent: Dec. 3, 2013

(54) METHOD OF MANUFACTURING HETEROGENEOUS ELECTROCHEMICAL CAPACITORS HAVING A DOUBLE ELECTRIC LAYER AND OF MANUFACTURING AND BALANCING THE COULOMBIC CAPACITIES OF ELECTRODES FOR USE THEREIN

(75) Inventors: Samvel Kazaryan, Troitsk (RU); Gamir Kharisov, Troitsk (RU); Sergey Litvinenko, Zelenograd (RU); Sergey Razumov, Moscow (RU)

(73) Assignee: Universal Supercapacitors LLC, Columbus, OH (US)

( * ) Notice: Subject to any disclaimer, the term of this patent is extended or adjusted under 35 U.S.C. 154(b) by 0 days.

(21) Appl. No.: 13/468,648

(22) Filed: May 10, 2012

(51) Int. Cl.
  *H01L 21/8242* (2006.01)
  *H01L 21/20* (2006.01)
  *H01G 9/00* (2006.01)

(52) U.S. Cl.
  USPC ............ 438/239; 438/393; 438/381; 361/502

(58) Field of Classification Search
  USPC .......................... 438/239, 381, 393; 361/502
  See application file for complete search history.

(56) References Cited

U.S. PATENT DOCUMENTS

| | | | |
|---|---|---|---|
| 6,628,504 B2 * | 9/2003 | Volfkovich et al. | 361/502 |
| 7,006,346 B2 * | 2/2006 | Volfkovich et al. | 361/502 |
| 7,446,998 B2 * | 11/2008 | Kazaryan et al. | 361/502 |
| 7,919,014 B2 * | 4/2011 | Kazaryan et al. | 252/506 |
| 7,923,151 B2 * | 4/2011 | Lam et al. | 429/225 |
| 2008/0199737 A1 * | 8/2008 | Kazaryan et al. | 429/9 |

* cited by examiner

*Primary Examiner* — Luan C Thai
(74) *Attorney, Agent, or Firm* — Standley Law Group LLP

(57) ABSTRACT

Manufacturing methods for the formation of positive electrodes and the balancing of Coulombic capacities of positive and negative electrodes for use in a heterogeneous electrochemical capacitor (HES) having a $PbO_2|H_2SO_4|C$ system. Exemplary methods make it possible to manufacture capacitors with both non-formed and pre-formed positive electrodes. Capacitors produced by the exemplary methods may be used, for example, as secondary power sources to level loads of power networks, power electric vehicles, cellular and mobile communications, emergency lighting systems, telecommunications, and solar and wind energy storage devices.

37 Claims, 16 Drawing Sheets

METHOD OF MANUFACTURING HETEROGENEOUS ELECTROCHEMICAL CAPACITORS HAVING A DOUBLE ELECTRIC LAYER AND OF MANUFACTURING AND BALANCING THE COULOMBIC CAPACITIES OF ELECTRODES FOR USE THEREIN

TECHNICAL FIELD

The present invention relates to double electric layer ("DEL") electrochemical capacitors. More particularly, the present invention relates to a method of manufacturing DEL heterogeneous electrochemical supercapacitors ("HES'") having balanced positive and negative electrode Coulombic capacities.

BACKGROUND

Pre-formed, non-polarizable electrodes are commonly used to manufacture different DEL HES', in particular, capacitors having a $PbO_2|H_2SO_4|C$ system. In a HES having a $PbO_2|H_2SO_4|C$ system, use is made of a positive electrode with lead dioxide ($PbO_2$) active material, such as is shown, for example, in U.S. Pat. Nos. 6,195,252 and 6,842,331. Electrodes with a lead dioxide active material are used as positive electrodes for lead-acid batteries, and are currently manufactured using various methods. A mixture of metal lead (Pb) powders and different lead oxides ($Pb_3O_4$ and PbO) are frequently used for the manufacture of positive electrodes with $PbO_2$ active material. A paste is manufactured by mixing powders and an aqueous solution of sulfuric acid. The resulting paste is puttied in a positive electrode grid and then dried. After the electrode is dried it is formed. As a general rule, the amount of lead sulfate ($PbSO_4$) in the dry non-formed active material does not exceed 5%. The formation process makes it possible to oxidize all the active material to a lead dioxide.

Positive electrodes are typically formed by one of two main methods. According to a first method, positive electrode plates are formed in combination with negative electrodes before the associated lead acid battery or HES having a $PbO_2|H_2SO_4|C$ system is formed. In order to manufacture lead-acid batteries, both positive and negative pre-formed electrodes are used. In the manufacture of a HES, pre-formed positive electrodes are used.

According to a second method, positive and negative electrodes are formed after assembly of a battery. The second method is primarily used for the manufacture of advanced lead-acid batteries, and is easier, ecologically safer, and less costly than the first method.

When a formation method for a positive electrode is available, it is possible to use positive electrodes pre-formed and made of lead oxide. However, this method is not optimal, and does not allow for the manufacturing of capacitors with high and stable specific energy, capacity parameters, or improved cost. When a HES with pre-formed positive electrodes is assembled, the positive electrodes are fully charged, while the negative electrodes are fully discharged. To provide for serviceability of a capacitor, both the positive and negative electrodes need to be in a fully charged state. Therefore, when a capacitor is manufactured using formed positive electrodes, an additional process is performed after assembly to balance the Coulombic capacities of the capacitors' positive and negative electrodes.

The technology and process of balancing the Coulombic capacities of capacitor electrodes' depends upon the design and overall dimensions of the electrodes. In addition, known techniques for balancing Coulombic capacities require labor-intensive, costly and long procedures. Because high rates of oxygen recombination are typical of all HES' having an aqueous electrolyte, the process of balancing sealed capacitors becomes more complicated. In particular, a HES having a $PbO_2|H_2SO_4|C$ system where the porous carbon DEL electrode is negative, is quite complicated. High oxygen recombination in the capacitor's negative electrode results in high efficiency of the oxygen cycle and impedes the evolution of oxygen from the capacitor during its charge, which in turn appreciably decreases the efficiency of the balancing process.

In one known method of forming and charging a DEL capacitor negative polarizable carbon electrode, a HES is manufactured using a pre-formed positive electrode with a $PbO_2/PbSO_4$ active material and a negative electrode based on activated carbon materials. An aqueous solution of sulfuric acid is used as an electrolyte. The capacitor, prior to its sealing, is placed in a sealed chamber through which an inert gas flow (nitrogen or argon) is circulated. Thereafter, the capacitor is charged. The process of charging the capacitor is complete when the potential of the negative electrode reaches a pre-set value. After the potential reaches this pre-set value, the capacitor is sealed. During the charging phase, the positive electrode generates oxygen, and the negative electrode produces hydrogen. To provide effective removal of hydrogen and oxygen from the capacitor, separators and/or electrodes having extended channels are used.

This method of forming and charging a DEL capacitor negative polarizable carbon electrode has many drawbacks that prevent the manufacture of capacitors with high specific energy parameters and low cost. This method of capacitor manufacturing does not take into account the current state of the art with respect to the manufacture of $PbO_2/PbSO_4$ positive electrodes. This omission makes it impossible to manufacture commercial capacitors having wide applications. The aforementioned capacitor design allows for only one plate of the positive electrode to be used; making it impossible to manufacture a capacitor with high capacitance and discharge energy. To manufacture capacitor systems having high discharge energies by this known method, it is required to connect many capacitor cells, which brings about an abrupt deterioration of the specific parameters, an increase in cost and a decrease in the reliability of capacitor system operation.

When capacitors having a $PbO_2|H_2SO_4|C$ system are manufactured as described above, the pre-formed positive electrode is fully charged. However, the negative electrodes are in a discharged state. To provide a functional capacitor after assembly, the Coulombic capacities of the positive and negative electrodes need to be balanced. To make balancing the Coulombic capacities possible, the negative electrode is overcharged. Because the Coulombic capacity of the positive electrode is considerably higher than that of the negative electrode, the process must be repeated several times. This need to repeat the balancing step increases the time and cost of the capacitor manufacturing process.

Since the positive electrodes are in a charged state during the initial stage of the Coulombic capacity balancing step, oxygen is evolved in the positive electrode. The rate of the oxygen evolution increases along with a growth of the positive electrode's state of charge. The oxygen diffuses to the negative electrode and discharges it, which prevents the balancing process. As a result of this discharge, the negative electrode is not fully charged, and the specific energy and capacity parameters of the capacitor do not reach their maximum values. To effectively balance the Coulombic capacities of the positive and negative electrode it is necessary to charge the capacitor under conditions that ensure a full charge of the negative electrode. For a maximum charge of the negative electrodes of a HES, it is necessary to remove the oxygen from the capacitor. The efficiency of the Coulombic capacity balancing process depends upon the efficiency of the oxygen removal. The oxygen removal process is particularly important for capacitors having large electrodes.

According to the previously described known method, the oxygen is removed during the Coulombic capacity balancing process by a flow of inert gas. This method of oxygen removal has several drawbacks. First, an inert gas flow may effectively remove the oxygen only from the periphery of the electrodes. Since the oxygen creates excessive pressure inside the capacitor case, the penetration of the inert gas flow into the central portion of the electrodes is impeded. Even high intensity inert gas flow will not effectively remove oxygen from the central portion of the capacitors. A non-uniform removal of oxygen from the capacitor will result in a non-uniform charge of the negative electrodes.

Therefore, this method of oxygen removal does not provide efficient balancing of electrode capacities across a broad range of capacitor designs and sizes. It may only be effective for capacitors having one positive plate and two negative plates of small dimensions. Additionally, the use of an inert gas flow makes it impossible to perform an effective and uniform removal of oxygen during a Coulombic capacity balancing process. Thus, the use of this known method will result in a strong and non-uniform heating of the capacitor, which will have a negative affect on the parameters of the non-polarized electrodes thereof.

Second, the inert gas may partially fill the pores of DEL capacitor negative electrodes by displacing the electrolyte. As a result, the polarization resistance of the polarizable electrodes may increase while charging the electrodes. Additionally, the potential of DEL capacitor negative electrodes may appreciably shift toward lower values at low levels of charge. Consequently, the manufacturing method described above does not allow for: 1) an accurate and correct determination of the charge of the negative electrode; 2) a full balancing of an electrode's capacities; or 3) a high and maximum specific parameters of a HES.

In order to manufacture capacitors with high specific energy and capacity parameters, activated carbon materials with large, developed areas are frequently used. A large developed surface area may be covered by pores having a diameter of about 0.5-3 nm. Another portion of the surface is covered by pores of small dimension making it difficult to fill with electrolyte. Therefore, the value of the capacitance of activated carbon DEL capacitor polarizable electrodes depends considerably on the rate of the filling of the electrodes' pores by the electrolyte. An effective filling of the polarizable electrodes' pores by the electrolyte is important to provide for maximum energy and capacity parameters and an appropriate balance of the Coulombic capacities. Depending on the parameters of the porous structure and manufacturing process of the DEL capacitor electrodes, the filling of small size pores by the electrolyte may take several days under normal conditions. To speed up this process, different methods of carbon electrode wetting by the electrolyte are employed.

The values of the polarization resistance and potential of DEL capacitor electrodes are related to the filling of the pores by the electrolyte. A partial filling of the pores results in a DEL capacitor electrode having elevated values of the polarization resistance and the potential's polarization. Therefore, during the charge of a HES there occurs a rather strong polarization of the potentials toward the negative area of only the near surface layers of the DEL capacitor negative electrodes, while the deeper layers of the electrodes are charged to a lesser extent. (See, e.g., S. A. Kazaryan et al., J. Electrochem. Soc., 153 (9), A1655-A1671, 2006).

In this case, immediately after the charge current of the capacitors is turned off, the potential of the negative electrodes shift unevenly toward positive values. Due to this effect, there occurs decomposition of the electrolyte and evolution of hydrogen in the capacitor's negative electrode in the area of the potentials of the electrolyte's thermodynamic stability. (See, e.g., B. Pillay and J. Newman, J. Electrochem. Soc., Vol. 143, No 6, 1996). A similar effect takes place when oxygen is removed from capacitors by an inert gas flow. A non-uniform effect of the inert gas on the DEL capacitor electrodes results in uneven distribution of the charge current density and the potential of the electrodes along the surface area and thickness. In the portions of the DEL capacitor electrodes where there is a strong effect of the inert gas, the potential decreases and hydrogen is evolved. The hydrogen displaces the electrolyte from the electrodes' pores. This, in turn, brings about further growth of the polarization resistance of the polarizable electrodes, which has a negative effect on the parameters of the capacitors and the process of balancing the Coulombic capacities.

SUMMARY

The present invention provides an effective method of filling the pores of a DEL capacitor's carbon material electrodes with electrolyte, including small size pores, and is also a more effective method of balancing the Coulombic capacities of the positive and negative electrodes in a HES. According to the present invention, it becomes possible to manufacture a commercial HES with both high specific energy parameters and low cost. Thus, the proposed exemplary methods of manufacturing an HES make it possible to manufacture capacitors that can be effectively used as a secondary power source for leveling of electricity supply network loads, floor electric vehicles, cellular and mobile communication means, emergency lighting systems, telecommunication systems, and solar and wind energy storage.

The present invention provides a solution for the commercial manufacturing of a DEL HES having a $PbO_2|H_2SO_4|C$ system by: using a non-preformed plate for the positive electrode, by improving the method of balancing the electrodes' capacities, and by a reduction in the duration of balancing when pre-formed positive electrodes are used. When non-preformed positive electrodes are used, the positive electrodes are formed as a component of the capacitor after the assembly process. During the formation of the capacitors' positive electrodes the Coulombic capacities of the positive and negative electrodes are simultaneously balanced. The methods of the present invention make it possible to appreciably increase the specific energy parameters of the capacitors, facilitate manufacturing, and decrease manufacturing costs. Moreover, by utilizing a more effective method of balancing the Coulombic capacities of a capacitors' positive and negative electrodes when a pre-formed positive electrode is used, the efficient commercial manufacture of the capacitors has become possible.

Exemplary methods of manufacturing a DEL HES, the filling of electrode pores with electrolyte, the formation of positive electrodes, and the balancing of the Coulombic capacities of the positive and negative electrodes according to the present invention are explained by the following description of exemplary embodiments and associated drawing figures.

BRIEF DESCRIPTION OF THE DRAWINGS

FIG. 1b is a cross-sectional front view of the HES of FIG. 1a;

FIG. 2b is a front view of the negative electrode of FIG. 2a;

FIG. 3b is a front view of FIG. 3a;

DETAILED DESCRIPTION OF EXEMPLARY EMBODIMENT(S)

Figure 1A:
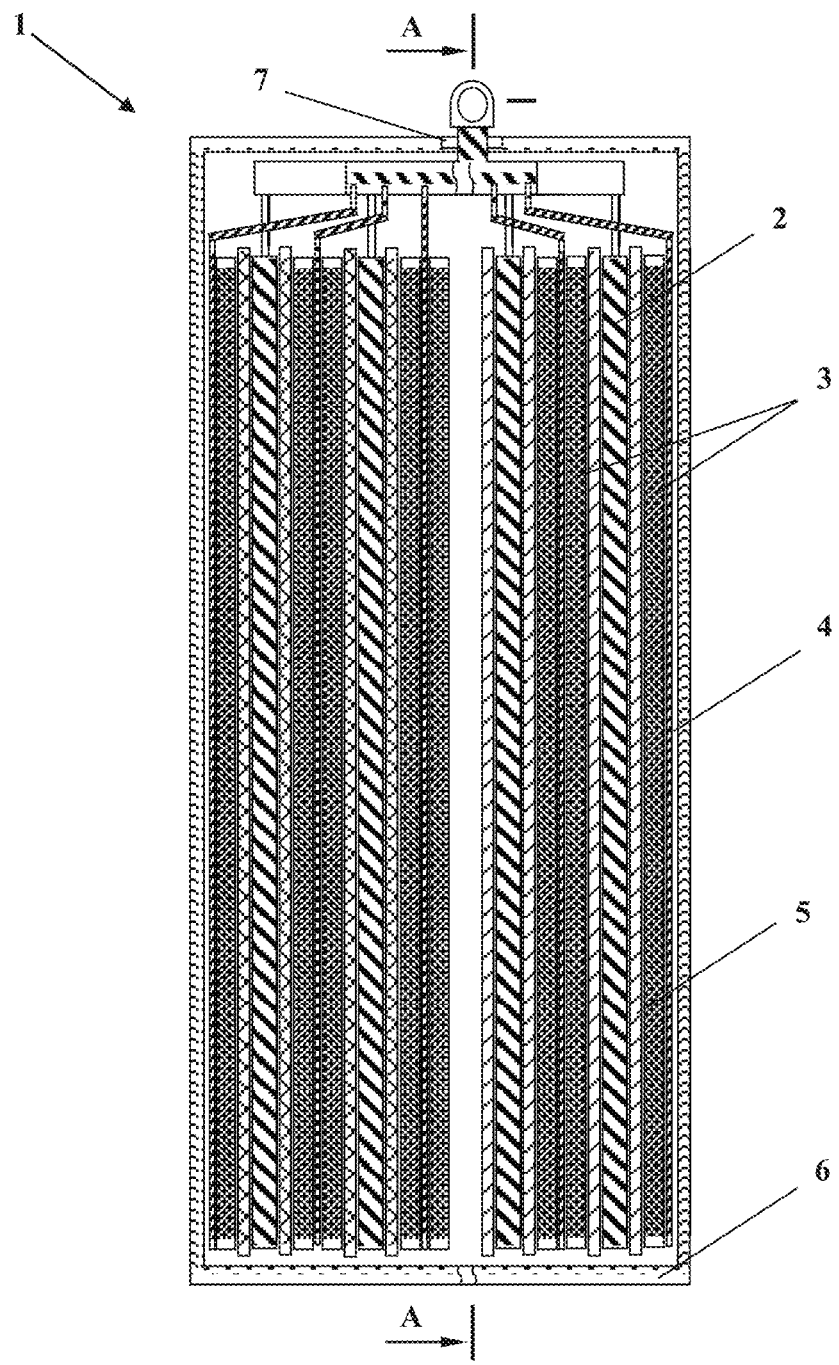
FIG. 1a is a cross-sectional end view of an exemplary HES having positive and negative electrodes.

The specific energy, capacity parameters, cycle life, stability of operation, and cost of a HES are closely related to its electrochemical and physical properties, its design, the properties of the selected electrolyte, the associated method of manufacturing employed, and the cost of the capacitors' components. The unique parameters and properties of activated carbon materials makes it possible to manufacture electrodes for a DEL HES. HES' having different systems have been developed and manufactured. These capacitors have specific energy and power parameters of practical importance and a high cycle life. Of all known HES', those having a $PbO_2|H_2SO_4|C$ system have the highest specific energy parameters and lowest cost.

The active material of a positive, non-polarizable electrode in a HES having a $PbO_2|H_2SO_4|C$ system is a mixed phase of lead dioxide and lead sulfate. A DEL negative electrode is made of a material based on conductive activated carbon attached to a current collector. During charging of a HES having a positive electrode with an active material of lead sulfate, the lead sulfate is partially oxidized to lead dioxide. In the negative electrode, an electric charge and energy are accumulated in the DEL. When the capacitor is discharged, an inverse processes take place in its electrodes. Despite the fact that different electrolytes may be used, the highest parameters are obtained when sulfuric acid is used, as described in U.S. Pat. No. 6,195,252.

When such a positive electrode is fully charged, its active material contains only lead dioxide. The equilibrium potential of this electrode at room temperature and about a 1.26 g/cm³ electrolyte density is approximately 1.7 V (in relation to SHE potential). During the discharge of a HES, the lead dioxide in the positive electrode transitions into lead sulfate ($PbSO_4$), producing a mixed phase of $PbO_2$ and $PbSO_4$ in the active material of the positive electrode of a partially discharged HES. The ratio of $PbO_2$ and $PbSO_4$ in the active material of the positive electrode depends on the capacitor's design and voltage. Usually, at a 100% depth of positive electrode discharge, the coefficient of utilization of active materials is about 55-70%, subject to the porous spatial structure of the active material (i.e. when the positive electrodes are fully discharged only 55-70% of the lead dioxide transitions to lead sulfate). Since lead dioxide has high conductivity, and lead sulfate is a dielectric, the serviceability of the electrode's active material is related to the content of lead dioxide in the active material. When the content of lead dioxide in the active material is below about 30%, the resistance of the active material grows dramatically and the positive electrode loses its serviceability. Therefore, the maximum Coulombic capacity of the negative electrodes should not be higher than the Coulombic capacity of the positive electrodes in the maximum range of a HES operating voltage.

The cycle life of a HES is essentially determined by the cycle life of its non-polarizable electrode. The cycle life of a non-polarizable positive electrode having $PbO_2/PbSO_4$ active material depends on the depth of discharge, state of charge, operation temperature, and values of charge-discharge currents. As the depth of charge, state of charge, and operation temperature of the positive electrode increase, the rate of decrease of the electrode's Coulombic capacity grows along with the increase of the number of the charge-discharge cycles. This results in a decrease of the cycle life of the positive electrode.

To provide a HES with a high cycle life, DEL electrodes having a Coulombic capacity several times lower than the Coulombic capacity of the non-polarizable electrode are selected, as is described in, for example, U.S. Pat. No. 6,222,723. In the present invention, Coulombic capacity of a HES is determined by the Coulombic capacity of the DEL electrode. A decrease in the Coulombic capacity of the non-polarizable electrode will not cause a decrease in HES Coulombic capacity or in HES energy parameters. The cycle-life of a HES increases along with an increase in the ratio of the capacities of its non-polarizable and polarizable electrodes.

While at high levels of charge and discharge, a decrease in the capacity of a positive electrode having a $PbO_2/PbSO_4$ active material is mostly determined by a change in the porous structure and phase composition of its active material. A decrease in the capacity at heavy overcharge is related to a change in the electrophysical properties and structure of the transition layer of the current collector's surface-active material interface. As positive electrode overcharge increases, the capacities decrease at a faster rate with an increase in the depth of the charge-discharge cycle.

For the manufacture of a sealed HES, where containment is provided by the oxygen cycle, it is necessary to select an optimal ratio of Coulombic capacities in the positive and negative electrodes and the state of charge of the positive electrodes. Since the rate of the hydrogen oxidation in the positive electrode of a HES having a $PbO_2|H_2SO_4|C$ system is negligible, the design of a HES should ensure that any evolution of hydrogen is ruled out in the negative electrode during HES operation, including cases of significant overcharging. This ensures reliable and safe operation of the HES.

The specific energy and capacity parameters of sealed capacitors are related to the parameters and efficiency of the oxygen cycle. During the capacitor's charge, the oxygen evolves in the positive electrode and diffuses to the negative electrode, where the oxygen is reduced to water with heat generation. In parallel with the reduction of oxygen, the capacitor's negative electrode gets discharged. The process of oxygen evolution in the positive electrode depends on such parameters as the electrode's state of charge, whether the electrode and electrolyte are of a material having low overpotential of oxygen evolution, the phase composition of lead dioxide, the value of the charge current, and the electrolyte temperature. During the charge of a positive electrode having a $PbO_2/PbSO_4$ active material, the evolution of oxygen becomes noticeable only after 80-85% of the state of charge—subject to the particular method of electrode manufacture and the value of the charge current. When positive electrodes are charged in the 80-100% range of their charge capacity, the rate of oxygen evolution increase along with increases to the state of charge and the value of the charge current.

An increase in the rate of oxygen evolution is accompanied by an increase in the rate of the oxygen cycle and an increase of the capacitor's temperature. The charge of a capacitor having a high oxygen cycle rate brings about two main negative consequences. First, recombination of oxygen takes place not only on the surface, but also penetrates deep into the DEL negative electrode. A long-time recombination of oxygen during capacitor charging brings about a considerable increase in the water amount and a decrease in electrolyte concentration in pores of the negative electrode. This results in an increase in capacitor polarization resistance, which brings about additional overheating. Second, the evolution of oxygen at the initial stage of the charging process reduces the energy and Coulombic efficiency of the capacitor, makes achieving a maximum charge impossible, and also makes it impossible to produce a capacitor with high specific energy parameters. Extended operation of a capacitor having an increased oxygen cycle is accompanied by a considerable overcharge of its positive electrodes, which brings about a decrease in the cycle life of the positive electrodes, and of the capacitor as a whole.

Therefore, in order to manufacture a sealed $PbO_2|H_2SO_4|C$ HES with high specific energy and capacity parameters, high Coulombic and energy efficiency, high cycle life, and stable parameters during extended operation, it is important to properly select the parameters of the negative electrodes and a method of optimally filling the pores thereof with the electrolyte.

DEL negative electrodes in a HES are usually made of different activated carbon materials. The potential zero charge (pzc) of most activated carbon materials in aqueous sulfuric acid solution is between about 0.2-0.3 V (in relation to SHE), subject to crystallographic and physical properties. Activated carbon materials have high chemical stability in different electrolytes, including aqueous sulfuric acid solution. It is only at a potential higher than about 1.0-1.1. V (in relation to SHE) that oxidation of the activated carbon materials takes place.

When there is a shift toward the negative area of potentials, the potential of the carbon materials is well polarized. The high overpotential of hydrogen evolution makes it possible to polarize carbon materials with low current densities to a potential value of about minus 0.45-0.5 V (in relation to SHE potential) without any evolution of hydrogen. A subsequent decrease in the potential of the carbon material DEL electrodes is accompanied by an increase in the rate of hydrogen evolution.

During polarization toward the area of negative potential, both the Ohmic resistance and polarization resistance of the carbon DEL electrodes increase. The increase in the resistance brings about an Ohmic shift in the potential value toward negative values. The value of the potential Ohmic shift depends on the density of the charge current, structure, and state of electrode charge. At high densities of charge current and a high state of charge of the negative electrodes with high values of Ohmic and polarization resistance, the potential of the electrodes shifts to a value of about minus 1.2 V. There is no noticeable evolution of hydrogen, and as soon as the charge current is turned off, the potential increases quickly to a value of about minus 0.5-0.55 V. Accordingly, any belief that the evolution of hydrogen in carbon electrodes becomes noticeable only at a potential of minus 1.2 V is erroneous.

It follows from the above that after the manufacture of a HES having a $PbO_2|H_2SO_4|C$ system with formed positive electrodes, the EMF is about 1.4-1.5 V, subject to the properties of the negative electrodes. The maximum allowable voltage of a HES during discharge by low currents is about 0.7 V and the equilibrium value of EMF in the maximum charged state of a HES is about 2.15-2.2 V. In order to increase the reliability of HES operation, it is desirable to increase the minimal discharge voltage of the capacitor to a value of about 0.8 V.

The capacitance of carbon material DEL electrode depends on the potential of the electrode. As an electrode's potential decreases, the capacitance of the electrode increases. Therefore, an increase in HES voltage results in a considerable increase of the capacitances and specific energy parameters.

During the charge and discharge of DEL electrochemical capacitors, the electric charge and potential energy of the polarizable electrode DEL are unevenly distributed by volume (i.e., during the charge and discharge of the capacitor, a volume polarization of the electric charge takes place, and accordingly, the potential energy of the polarizable electrode DEL takes place). As soon as the charge and discharge currents are turned off, redistribution of the DEL electric charge and a change of the electrode potential take place in the volume of the polarizable electrode (i.e., self-depolarization of the potential and energy of the DEL electrode takes place). (See, e.g., S. A. Kazaryan et al., J. Electrochem. Soc., 153 (9), A1655-A1671, 2006). This process is accompanied by a leveling of the polarizable electrode potential by volume, and by the loss of a portion of the capacitor's stored energy. During the self-depolarization of energy, after the charge, there is an accelerated decrease in capacitor voltage. Conversely, when the discharge current is turned off, capacitor voltage increases slowly. The lost energy is evolved as Joule heat and is determined by the flow of convection currents in the polarizable electrode.

The value of the energy of polarization is related to the parameters and design of the polarizable electrode, the design of the capacitor, and the modes of its charge and discharge. Polarization of energy in a HES with high energy density has a practical significance and a considerable effect on the energy, capacity, and operation parameters of a HES. The value of self-depolarization of the DEL electrode potential also depends on the filling of the electrode pores with electrolyte and the rate of balance of the Coulombic capacities of the positive and negative electrodes. Inefficient filling of the pores of DEL electrodes with electrolyte results in charge and discharge of only the electrodes' near-surface areas. As a result of inefficient electrolyte filling, a strong self-polarization of DEL electrode potential occurs, bringing about a substantial loss of stored energy and a decrease in the energy efficiencies of the charge-discharge cycles of the HES.

As illustrated by the following exemplary embodiments of the present invention, it is possible to appreciably minimize losses of energy by determining the effect of DEL electrode potential depolarization after the charge and discharge of capacitors with high currents. Apart from an increase in the specific energy parameters, exemplary capacitor manufacturing methods of the present invention bring about a considerable increase in the energy efficiency and stability of the energy parameters of a capacitor's charge-discharge cycle. The efficiency with which electrolyte can be made to fill the pore volume of an active carbon DEL electrode depends on the dimensions of the pores, the wettability of the electrode, and the spatial structure of the electrode.

The wettability of carbon electrodes by an electrolyte depends at least in part on the density of the states of electronic levels on the surface of the pore walls. During carbon electrode potential polarization toward negative values, an increase in the density of the surface states takes place, and the wettability of the electrode increases. Prior to the present invention, the pore volume of DEL electrodes was filled with gas before assembly of the associated capacitor, which impedes the effective and fast filling of the pores by the electrolyte. An effective and fast filling of a carbon electrodes' pores by an electrolyte may be accomplished by simultaneous removal of gases from the pores and a strong polarization of the electrodes' potential toward the area of the negative values.

FIG. 1a illustrates an exemplary DEL HES 1 having a $PbO_2|H_2SO_4|C$ system and comprising a number of positive electrodes 2 of an active $PbO_2/PbSO_4$ material, a number of porous carbon plate negative electrodes 3, with associated negative electrode current collectors 4, and a porous separator 5. The electrodes and separator are wetted by a rated amount of electrolyte. The electrode pack is placed in a case 6 with a seal 7 surrounding the electrodes' terminals 8 (shown in FIG. 1b).

Figure 1B:
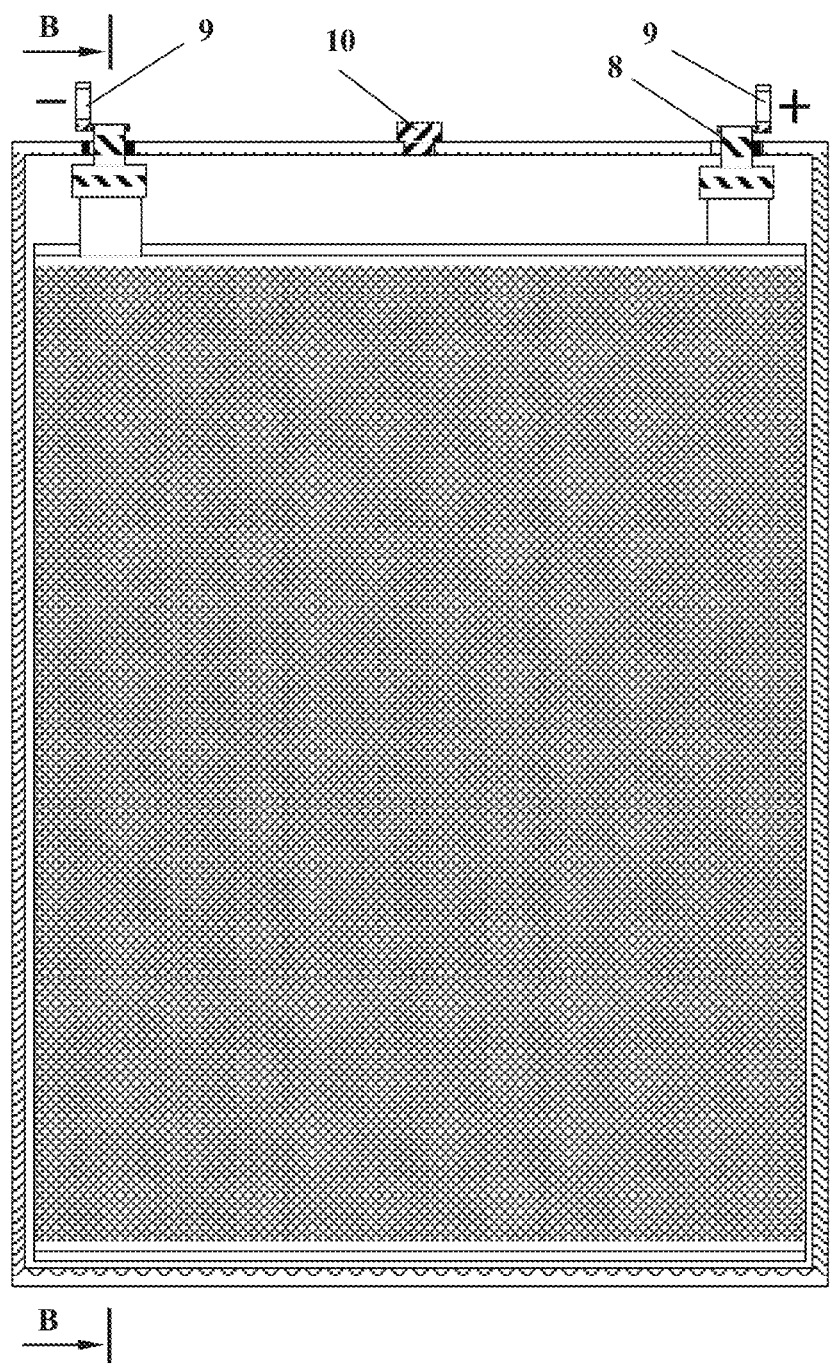

FIG. 1b illustrates the HES' connection clamps 9 and shows that the HES is equipped with an emergency valve 10. The present invention provides exemplary methods of manufacturing HES'.

One exemplary embodiment of the method of the present invention is the manufacturing of a capacitor 1 having non-formed positive electrodes 2. The formation of positive electrodes 2 and balancing of the Coulombic capacities of the positive and negative electrodes 2 and 3 is performed after the assembly of the capacitor. This embodiment allows the manufacturing of capacitors with high specific energy parameters at a low cost and without a complicated manufacturing process. Another exemplary method of the present invention is the manufacturing of the capacitor 1 using a preformed positive electrode 2. In this embodiment, the Coulombic capacities are balanced after the assembly of the capacitor.

Through research it was established that the life cycle of a sealed HES having a $PbO_2|H_2SO_4|C$ system is related to the depth of discharge and the state of charge of the positive electrodes. As the depth of discharge and state of charge of the positive electrodes increase, the cycle life of the capacitor decrease. An increase of the depth of discharge of the positive electrodes results in an increase of the specific energy parameters of the capacitors. The research established that the cycle life of the positive electrode in the sealed capacitor increases considerably when the state of charge of the positive electrode does not exceed 90-95% of the maximum Coulombic capacity. The cycle life of the positive electrodes decreases considerably when the depth of discharge is more than 85% of the maximum Coulombic capacity (i.e., the positive electrodes of the HES have a high cycle life when the state of the charge does not exceed about 90-95% and the depth of discharge is about 75-80% and as the depth of discharge decreases the cycle life of the positive electrodes and capacitor increase). In HES-capacitors with high life cycle life, the Coulombic capacities operation ratio may reach 75% of their maximum capacities.

During the balancing of the Coulombic capacities of the positive and negative electrodes 2 and 3, the states of charge of the capacitor's electrodes reach maximum values. Therefore, the method of manufacturing capacitors should be capable of providing 90-95% of the state of charge of the positive electrode 2 at 100% state of charge of the negative electrode 3 when the capacitor has the optimal state of charge. Exemplary methods of the present invention provide for this by providing optimal balancing of the electrodes' Coulombic capacities, unique properties of the DEL, active carbon, negative electrode, and other design features described below.

When the positive electrodes 2 are formed after the assembly of the capacitors 1 or after balancing of the Coulombic capacities of the electrodes in capacitors with pre-formed positive electrodes in the absence of oxygen, the positive and negative electrodes 2 and 3 are charged to the maximum degree. When the capacitors 1 are discharged to the voltage of 0.8 V, immediately after the formation of the positive electrodes 2 or balancing of the Coulombic capacities of the positive and negative electrodes 2 and 3, the depth of discharge of the positive electrodes 2 may reach the maximum value of the Coulombic capacities of the negative electrodes 3. The sealing of the capacitor 1 immediately after the discharge to a voltage of about 0.7-0.8 V by way of an installed emergency valve 10 results in the state of charge of the negative electrode 3 in subsequent charges of the capacitor never 100% due to the oxygen cycle; irrespective of the duration and method of the charge process. Consequently, the positive electrode 2 of the capacitor 1 after being sealed is also not charged to the maximum value. Research showed that when the maximum Coulombic capacity of the negative electrodes 3 is less than 30% against the maximum Coulombic capacity of the positive electrodes 2 after sealing the HES, the Coulombic capacity of the negative electrodes 3 decreases by about 5-10% (i.e., at the maximum state of charge of the capacitors, the state of charge of the positive electrodes 2 does not exceed 90-95% providing protection against overcharge of the capacitors' positive electrodes 2 and the high cycle life).

Currently in the manufacturing of electrochemical capacitors having DEL polarizable electrodes based on carbon materials, the carbon materials and current collectors of the electrodes are connected by mechanical clamping of the current collectors and carbon materials. This method of electrode manufacturing often requires excessively high external mechanical pressure on the capacitors' case 6 to provide for stable resistance and energy and power parameters. The current process makes the manufacturing process more complicated, decreases the specific energy parameters, and increases the cost. However, as shown in FIGS. 2a-2b and 3a-3b, a negative electrode 11 is manufactured by pasting the carbon plates 3 to the current collectors 4. The surface of the current collectors 4 have a conductive protective coating 12 and a thin conductive adhesive layer 13 applied (this layer is based on high conductive carbon materials and polymers which have high adhesion with carbon plates and current collectors and resistance to aqueous solution of sulfuric acid). The pasting of the carbon plates 3 and current collectors 4 provide for a low and stable "carbon plate-current collector" contact resistance making it possible to manufacture a whole negative electrode 11 and 14. This exemplary method facilitates the manufacturing of a HES and lowers the associated costs. The use of whole negative electrodes in a HES makes it possible to operate the capacitor without any external mechanical pressure on its case 6.

Figure 4:
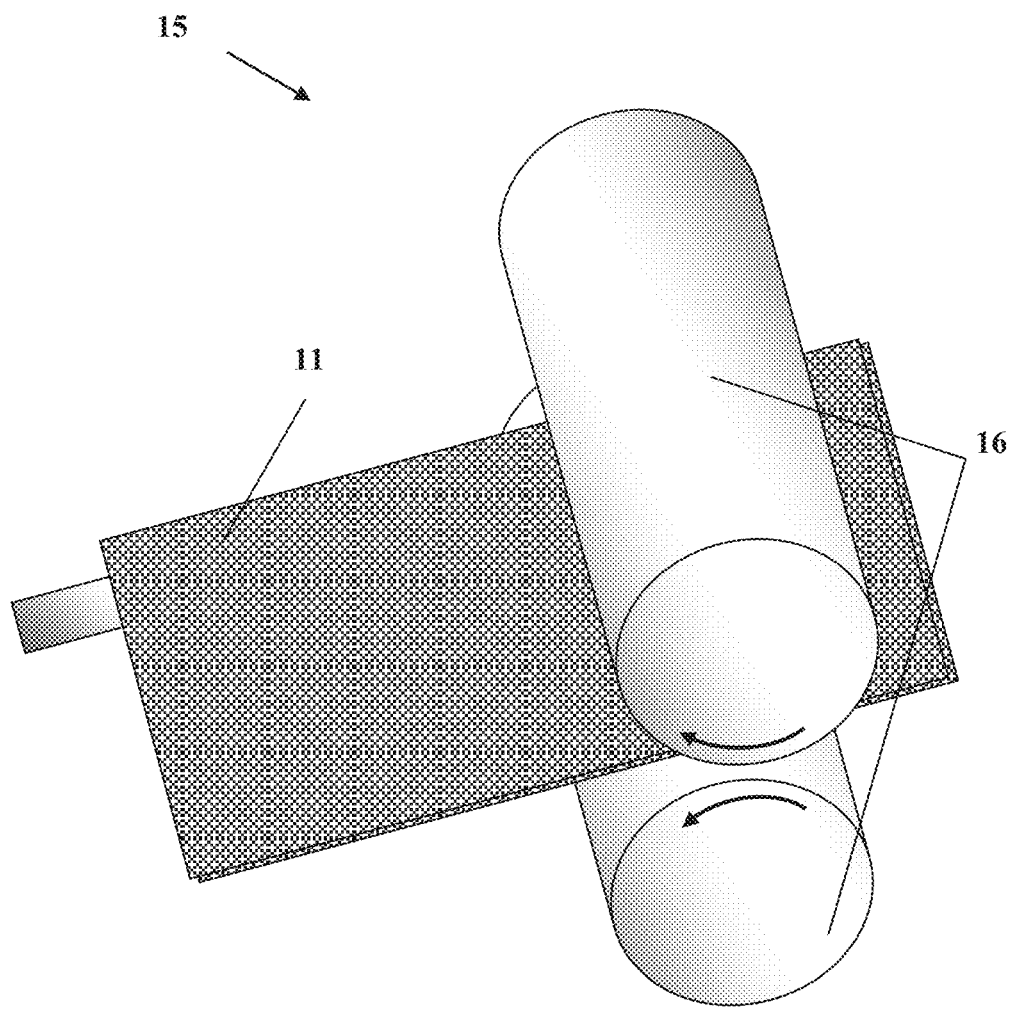
FIG. 4 illustrates a rolling process for joining carbon plates to a DEL electrode.

The carbon plates 3 and current collectors 4, having a protective coating, may be pasted using other methods. FIG. 4 shows one exemplary method of pasting 15 wherein the joint carbon plates 3 and current collector 4 with a protective coating 12 and adhesive layer 13 are rolled using cylinder rolls 16 that revolve synchronously. The gap between the cylinder rolls 16 is fixed to a desired thickness of the carbon plates 3, current collectors 4, and mechanical pressure on the electrode. Research has shown that the pasting method 15 provides for a low and even "current collector-carbon plate" 11 and 14 contact resistance at about 0.5-0.7 kg/cm$^2$ pressure of the rolls on the electrode. The even pattern of the contact resistance of the current collectors 4 and carbon materials along the entire surface of the negative electrodes 3 is one of the most important conditions in obtaining a HES with high specific energy parameters. The even pattern of the contact resistance provides for an even charge and discharge along the height of the electrodes, in particular in larger electrodes.

Figure 2A:
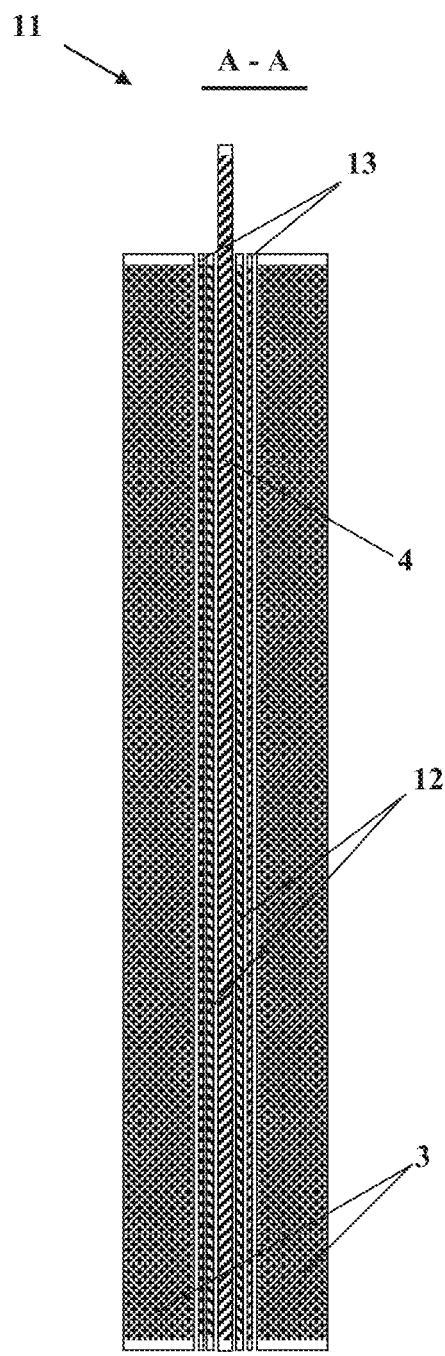
FIG. 2a is a cross-sectional end view of an exemplary DEL negative electrode of the present invention.
Figure 2B:
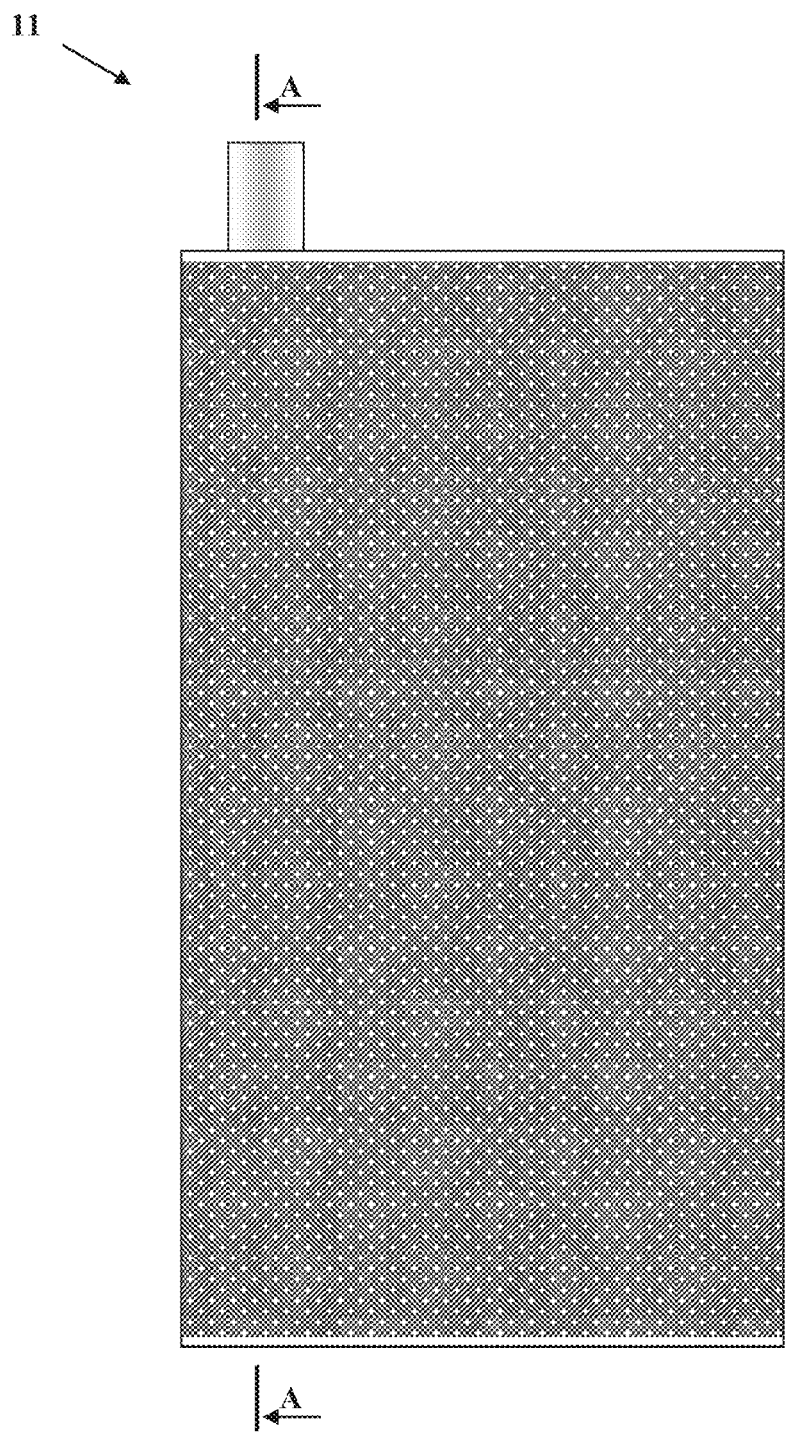
Figure 3A:
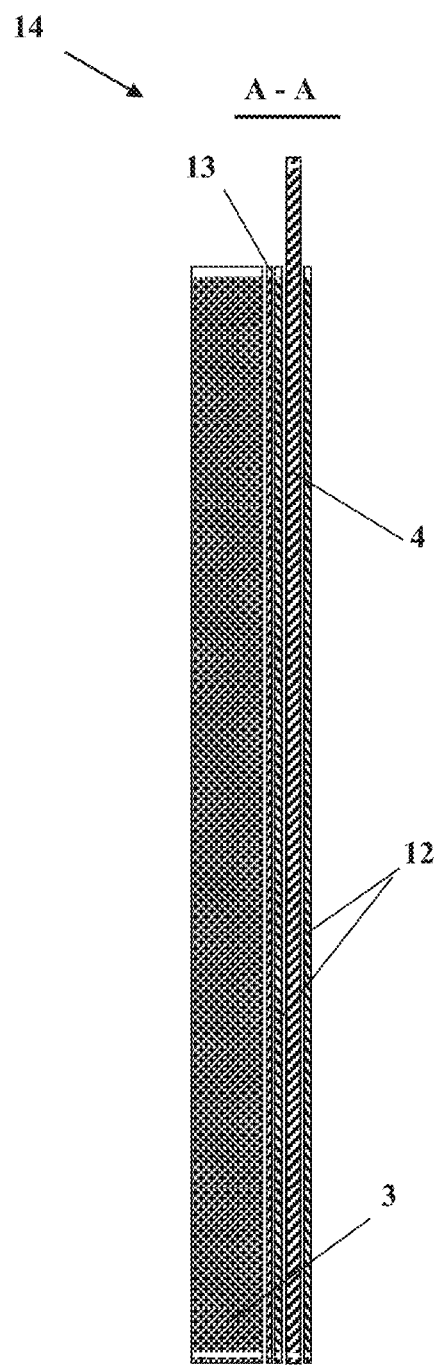
FIG. 3a is a cross-sectional end view illustrating the bonding of carbon plates to the current collectors of exemplary DEL electrodes according to the present invention.
Figure 3B:
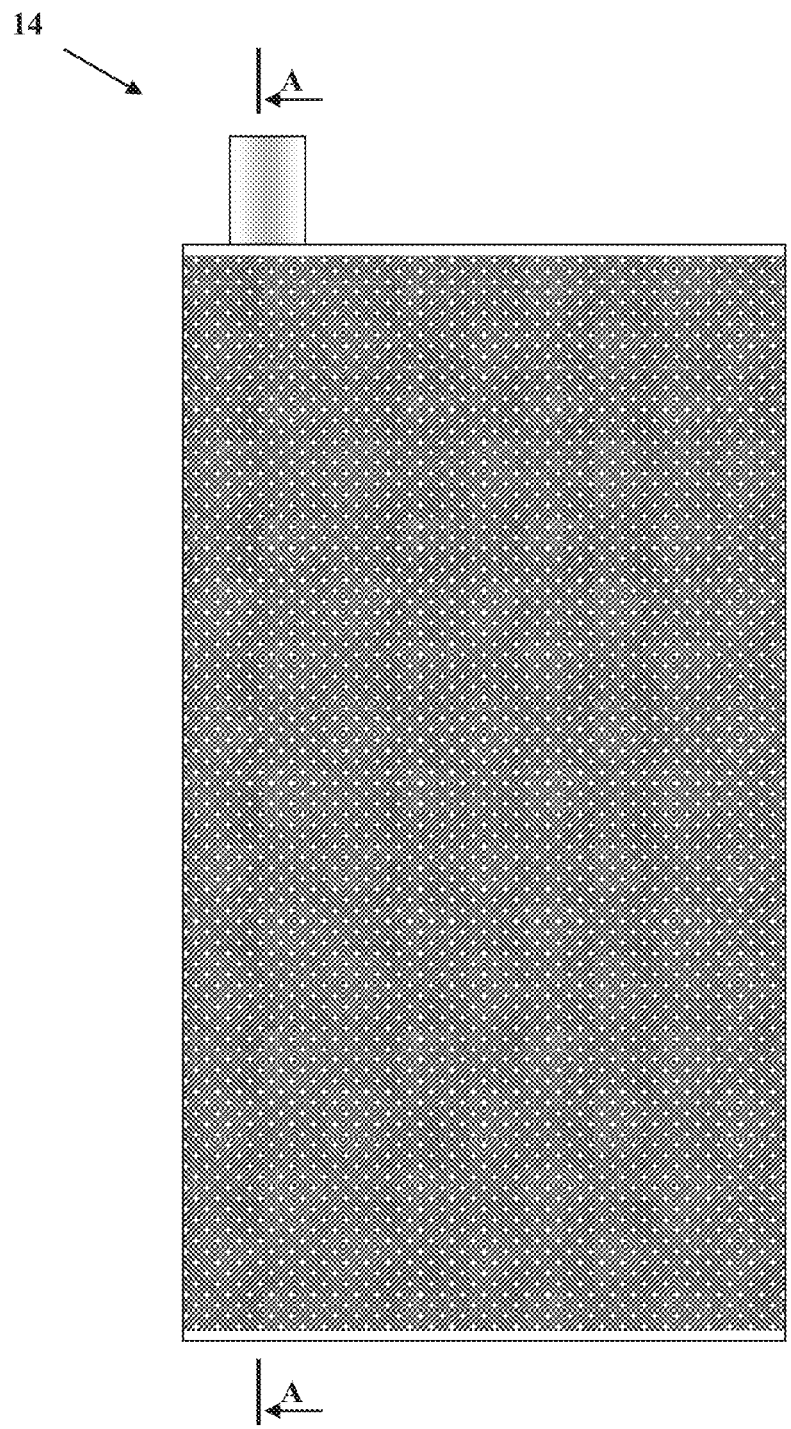

In an exemplary method of manufacturing a capacitor 1, an electrode pack is assembled with the desired count of the positive 2 and negative 11 electrodes and placed in the case 6. FIG. 2b illustrates an exemplary embodiment where there is a positive electrode 3 having only one plate wherein use is made of the negative electrodes 14. In the manufacturing of the capacitor 1 with a high number of plates of positive and negative electrodes 2 and 11, the end plates of the negative electrodes are made of the electrodes 14. This design is preferable because it provides for an identical depth of operation of all the plates of the negative electrode. Terminals 8 are cast from a lead alloy with the jumpers of the connection lugs of the positive and negative electrodes' current collectors. The capacitor's case is fixed and the cover is welded to the case and the capacitor's terminals 7 are sealed.

The filling of the capacitor 1, having non-formed positive electrodes, with electrolytes is performed after the assembly of the capacitor. The electrolyte is filled into the capacitor through an opening designed for the emergency valve 10. The amount and concentration of the electrolyte in the capacitor depends on the design, value of the capacitance, and purpose of each particular capacitor. The correct choice of amount and concentration of the electrolyte is substantially related to specific energy parameters, cycle life, and stability of the parameters of a HES and has considerable effect on the listed parameters. To provide a reliable sealing of the capacitor it is necessary to provide effective diffusion of oxygen in the electrodes and separator. The efficiency of the oxygen diffusion to the negative electrodes will increase with an increase of the quantity of the electrodes' and separator's pores that have no electrolyte i.e. the pores of the capacitor's electrodes and separator shall be partially filled with the electrolyte (i.e., when a HES is charged, both the volume and the concentration of the electrolyte increase and decrease during the discharge). Since a change in concentration and volume of the electrolyte takes place during the charge and discharge of a HES having a PbO$_2$|H$_2$SO$_4$|C system, the rate of the filling of the pores of the electrodes and separator changes during charge and discharge. Research of HES with different designs and different values of capacitance made it possible to establish that the amount of the electrolyte in HES of different designs and capacitance is optimal when about 90-100% of the pores in the electrodes and separator that are in a fully charged state are filled with electrolyte. Since the volume of the electrolyte decreases during the discharge, the rate of the filling of the pores in the electrodes and separator decreases with an increase of the depth of the discharge.

Also note that during the charge of a HES at a high rate, the electrolyte is partially displaced from the pores in the electrodes and separator to the capacitor's case. This is related to the fact that at high rates of charge, the rate of the increase of the electrolyte's volume is considerably higher than the rate of diffusion of the electrolyte in the pores of the electrodes and separator. As a result of this effect, during the charge and discharge at a high rate and to the maximum state of charge, at the end stage of the charge process a little amount of free electrolyte is evolved in the case of the capacitor. In an exemplary method it is preferable that the volume of free space in that portion of the case where the electrode pack is placed is small, because a slight change in the electrolyte's volume brings about a considerable change of its level. Even filling of the pores of the electrodes and separator with the electrolyte during its charge and discharge, results in an effective displacement of the electrolyte and leveling of its concentration. This effect is especially noticeable and plays quite a positive role in increasing the cycle life of the capacitor with a high number of electrodes and large overall dimension.

As stated above, the concentration of the electrolyte of a particular capacitor depends on its design, capacitance, and purpose. Through experimentation it was discovered that the most optimal concentration of electrolyte in different capacitors having a PbO$_2$|H$_2$SO$_4$|C system in the fully charged state is about 1.24-1.3 g/cm$^3$ (at the temperature of 25° C.). After the assembly of the capacitor with pre-formed positive electrodes, the capacitor is filled with the electrolyte of a working concentration. In order to fill the capacitor with non-formed positive electrodes, it is necessary to use an electrolyte with lower concentration. This is because when the positive electrodes are formed, the charge Coulombic capacity ($Q_F$[Ah]) of the capacitor is determined by the following formula:

$$Q_F = k \cdot M, \qquad (1)$$

where: k[Ah/k$_g$] is a coefficient having a value of about 440-480 Ah/kg, depending on the manufacturing method and composition of the active material in the positive electrodes and duration of the formation process and M[kg] is the mass of the active material of the non-formed positive electrodes. The maximum specific Coulombic capacity of the active material (PbO$_2$) of the formed positive electrode at 100% depth of its discharge is about 120-125 Ah/kg (theoretical value of the specific Coulombic capacity PbO$_2$ has the value of 224 Ah/kg). Consequently, it is clear from the formula (1) that during the formation of the positive electrodes a Coulombic capacity about 3.5 times higher than the actual maximum Coulombic capacity of the electrodes is used.

Bearing in mind that usually the Coulombic capacity of the positive electrodes of a HES is considerably higher than the Coulombic capacity of the negative electrodes, it is clear that during the formation of the positive electrodes the Coulombic capacity needed to form the positive electrodes is several times higher than the maximum Coulombic capacity of the negative electrodes. During the formation of the positive electrodes, after a full charge of the negative electrodes, there occurs evolution of hydrogen that goes on up to the end of the formation process. This results in a decrease of the amount of water in the electrolyte and an increase in the concentration of the electrolyte in the capacitor. Therefore, according to exemplary method of the present invention, the capacitor 1 with non-formed positive electrodes is filled with the electrolyte whose concentration is determined by the capacitor's design and capacitance. When calculating the electrolyte's concentration before the formation of the positive electrodes it is taken into account that after the formation process the electrolyte's concentration in a fully charged capacitor should be about 1.24-1.3 g/cm$^3$.

In an exemplary method of the present invention a capacitor 1, with non-formed and formed positive electrodes, is filled with the needed amount and concentration of electrolyte. After the electrolyte is added to the capacitor with non-formed positive electrodes, the capacitor was held in normal conditions for about 10-15 minutes for a preliminary impregnation of the electrodes and separator by the electrolyte. However, for a sufficient filling of the negative electrodes' pores with the electrolyte under normal conditions requires about 50-100 hours; depending on the type and manufacturing method of the carbon material. After the capacitor has been filled with an electrolyte, a considerable portion of the electrolyte 17 remains free in the capacitor, even during an extended exposure under normal conditions. When non-formed positive electrodes are used, it is preferable that after the capacitor is filled with an electrolyte, the time of impregnation before the commencement of formation is not more than about 50-60 minutes. This is due to the fact that, in the case of extended exposure sulfation of a considerable portion of the positive electrodes' active material occurs. As a result, large $PbSO_4$ crystals may form and are only partially oxidized to $PbO_2$ during formation; this considerably reduces the porosity and Coulombic capacity of the electrodes and after the formation the active material has a high content of $\alpha$-$PbO_2$ phase. In addition, the sulfation of a considerable portion of the active material in the non-formed electrode substantially reduces the electrolyte's concentration. This results in an increase of the lead sulfate solubility in the electrolyte with a low concentration of sulfuric acid. This often brings about formation of dendrites, increase of self-discharge current in the capacitors, and more importantly, reduces the cycle life and service life of the capacitor.

Figure 5:
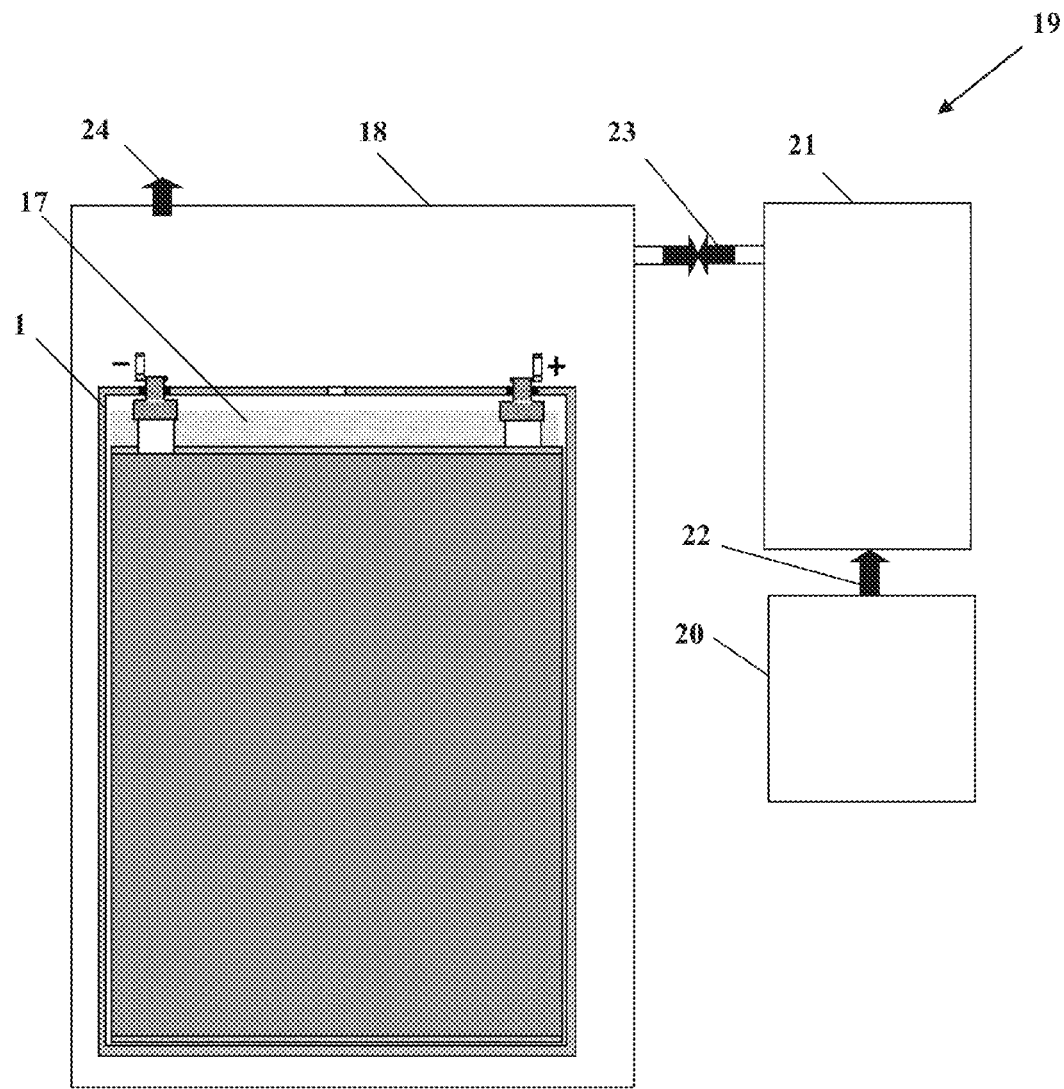
FIG. 5 is a diagram of an installation designed to fill a HES with electrolyte.

FIG. 5 illustrates another exemplary method of the present invention the capacitor 1, with non-formed plates of the positive electrode, is filled with an electrolyte and then exposed to the electrolyte for about 15-20 minutes under normal conditions. With the emergency valve 10 (shown in FIG. 1b) uninstalled, the capacitor is placed in a vacuum chamber 18 of the installation 19. The vacuum pump 20 pumps the air out of the vacuum chamber 21 when the vacuum valve 22 is open. When the pressure in the chamber 21 is lowered to about 30-40 mm Hg, the vacuum valve 23 is slowly turned to begin removing air from the chamber 18. The process of pumping the air from the vacuum chamber 18 and the capacitor 1 continues until the pressure in the chamber 18 is about 10-15 mm Hg. The optimal time of exposure of the capacitor 1 in the vacuum chamber 18 at the pressure of about 10-15 mm Hg is about 15-20 minutes depending on the overall dimensions of the capacitor. After exposure, the vacuum valve 23 is closed and valve 24 is opened allowing air to slowly begin to fill the chamber 18.

After the above procedure only a small amount of free electrolyte, which will be fully absorbed by the negative electrodes following the formation of the positive electrodes, is left in the case of the capacitor 1 and the capacitor is ready for the formation of the positive electrodes. Research showed that evacuation (vacuumization) of the capacitor makes it possible to significantly increase the efficiency of the filling of the pores and speed up impregnation of the negative electrodes by the electrolyte.

In another exemplary method of the present invention provides for the manufacturing of a HES with the capacitance of more than 500 kF. During the filling of the electrolyte and formation of the positive electrodes, a large amount of thermal energy is generated resulting in excessive overheating and the electrodes' failure. It is desirable that during the formation of the positive electrodes the temperature of the capacitor does not exceed about 50° C. An increase of the temperature over about 50° C. will result in an irreversible deterioration of the capacity, power, and cycle life parameters of the positive electrodes and the active mass of the formed positive electrodes, after the formation, will consist mostly of $\alpha$-$PbO_2$ phase. In order to manufacture the capacitor 1 with high capacitance, an exemplary method provides for the use of the cooled electrolyte to be filed in the capacitor and forced cooling of the capacitor in the process of the positive electrodes' formation.

Immediately after the filling of the electrolyte with the subsequent vacuum pumping of the gases from the electrodes and separator of a HES 1, with non-formed positive electrodes, a formation process of the positive electrodes is performed. The formation of the positive electrodes occurs by passing electric current through the capacitor causing electrochemical oxidation of the positive electrodes' active mass forming lead dioxide. The Coulombic capacity of the formation process is determined by the formula (1). For the formation of the positive electrodes it is possible to use different profiles of the charge current. However, formation by constant current is preferable. This facilitates the process of formation, and brings about a lower heating of the capacitor, and the active mass of the positive electrodes are formed evenly.

During the formation of positive electrodes by constant current, the most optimal value of the formation current ($I_F$ [A]) is determined by the following formula:

$$I_F = \frac{Q_F}{t_F}, \tag{2}$$

where $t_F$[h] is the time of formation; $Q_F$[Ah] is the Coulombic capacity of the formation which is determined by the formula (1). The time of formation depends on the design and value of the capacitors' capacitance, but it is desirable that the time of formation does not exceed about 60-65 hours depending on the manufacturing method of the positive electrodes. When the time of formation is more than 65 hours, usually the active mass of the electrodes contain macrocrystalline lead sulfate and have low specific Coulombic capacity. The time of formation is selected to ensure that during the formation, the maximum temperature of the capacitor does not exceed about 50° C. Research of the formation processes of the positive electrodes as components of HES with different designs and different capacitances showed that the most optimal formation time of different capacitors with the capacitance up to 150 kF is about 40-65 hours. When a cooled electrolyte is used to fill the capacitors and/or using forced cooling of the capacitors in the process of formation is performed, the formation time of the capacitors may be lower than the mentioned values.

An increase of the temperature of the capacitor's electrolyte during the formation of the positive electrodes brings about improvement of the carbon plates' wettability. On the other hand, an elevated temperature of the electrolyte has a negative effect on the parameters of the positive electrodes. The results of different experimental research of the formation process of the positive electrodes as components of capacitors showed that the most optimal temperature of a HES during formation of positive electrodes is about 35-45° C. When the capacitor's temperature during the formation does not exceed about 45° C., the active mass of the positive electrodes after the formation contains mostly β-$PbO_2$ phase, providing high specific Coulombic capacity of the positive electrodes and high cycle life of the capacitors.

To form the positive electrodes of the capacitor, the positive electrode's clamps should be connected to the clamps of the current source, with the pre-set value of the formation current. During the manufacture of the positive electrodes a thin oxide layer is formed, reducing the efficiency of formation and Coulombic capacity of the electrodes. It is desirable to polarize the positive electrode at the start of formation toward the negative potentials for about 5-10 minutes. This procedure makes it possible to reduce the thin oxide layer of the surface of the positive electrode's grid to the state of lead. Further, the polarization of the current source changes and continuous formation of the positive electrodes is performed during $t_F$ time. After the completion of the formation process, the capacitor's discharge is performed by the formation current to about 0.8 V voltage of the capacitor and an emergency valve 10 is fixed in the capacitor. The capacitor is charged to the optimal voltage, control testing of its energy and capacity parameters is performed and the capacitor is ready for operation.

For the manufacture of a HES 1, with pre-formed positive electrodes 2, the capacitor is assembled according to the exemplary method of the assembly of the capacitors with non-formed positive electrodes. After the assembly, the capacitor is filled with electrolyte with an appropriate working concentration and in the needed quantity. It is desirable to ensure that the electrolyte's concentration is about 1.24-1.3 g/cm³ (at 25° C. temperature).

Figure 6:
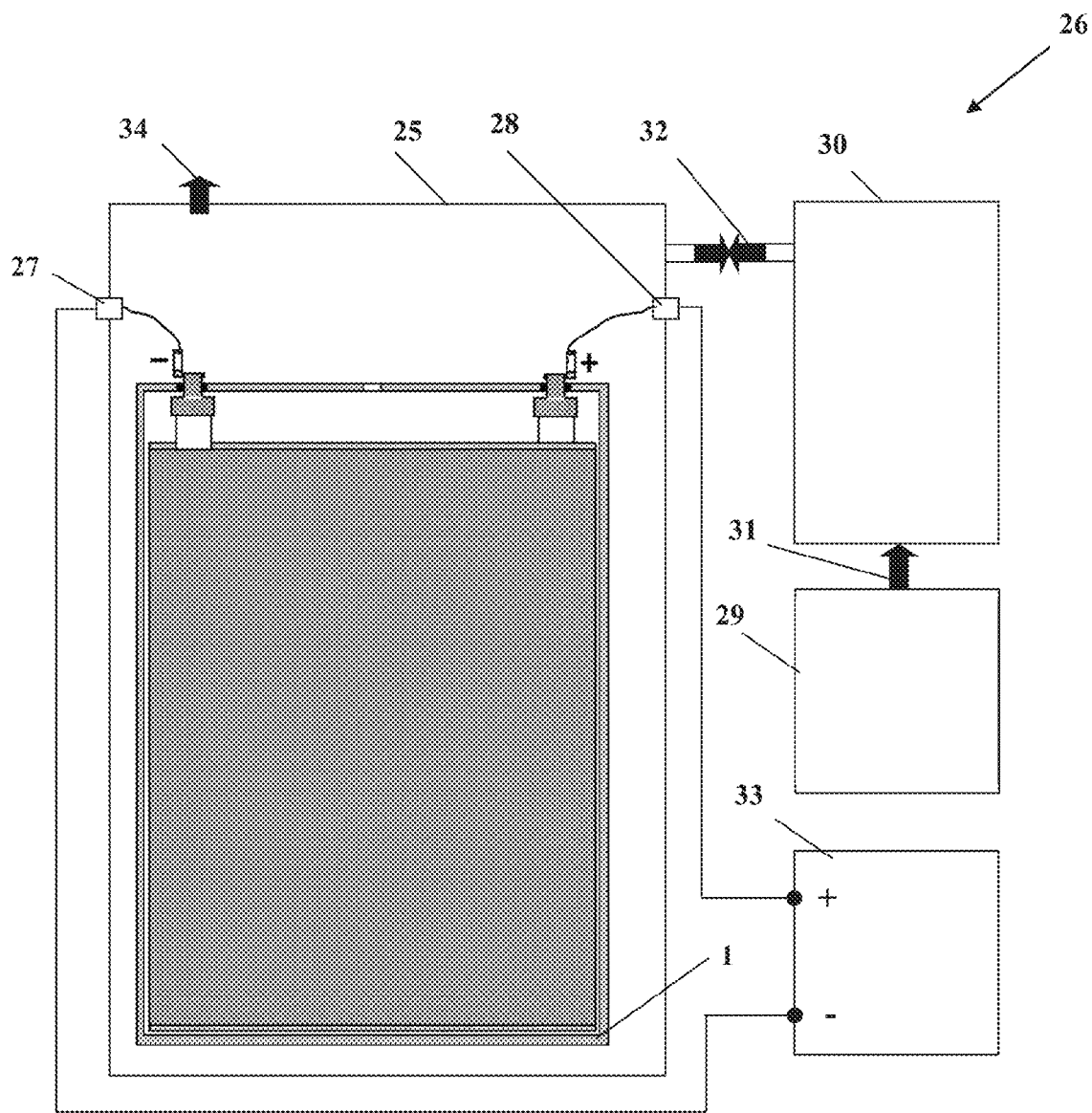
FIG. 6 is a diagram of an installation designed to balance the Coulombic capacities of the positive and negative electrodes of a HES.

FIG. 6 illustrates an exemplary method of the present invention. After the filling the capacitor 1, with formed plates of the positive electrode, with electrolyte and exposure of the capacitor without any emergency valve 10 (shown in FIG. 1b) installed for not less than about 15-30 minutes, under normal conditions, the capacitor is placed in a vacuum chamber 25 of the installation 26. The negative current clamp 9 (shown in FIG. 1b) of the capacitor is connected to the sealed connector 27 and the positive clamp 9 is connected to the sealed connector 28 and the vacuum chamber 25 is sealed. The vacuum pump 29 pumps the air from the vacuum chamber 30 with the vacuum valve in an open position. After the air is removed from the vacuum chamber 30 to the value of about 30-40 mm Hg, the vacuum valve 32 is slowly shifted into the position of the vacuum chamber's 25 pumping. The process of pumping air from the vacuum chamber 25 and the capacitor 1 continues until the pressure in the chamber goes down to about 10-15 mm Hg. After about 25-30 minutes of exposure of the capacitor 1 in the vacuum chamber 25 at the above values of pressure, the main portion of free electrolyte is absorbed by the electrodes and separator of the capacitor. Further, the positive pole of the current source 33 is connected to the positive clamp of the capacitor 1 and the negative pole is connected to the negative clamp, and the balancing of the Coulombic capacities of the positive and negative electrodes of the capacitors is performed. During the process of balancing of the Coulombic capacities of the positive and negative electrodes the process of vacuuming gases from the capacitor continues.

To provide a serviceable capacitor, it is now necessary to charge the negative electrodes. It is desirable to ensure that in a fully charged state, the state of charge of the positive electrodes does not exceed 90-95%, and the state of charge of the negative electrodes is about 100%. After filling the capacitor with electrolytes the capacitor's voltage is about 1.3-1.4 V, depending on the type of the negative electrodes. During the balancing of the capacities of the capacitor's electrodes, after a full charge of the positive electrodes the state of charge of the negative electrodes will not be high. With an increase in the state of charge of the negative electrodes, oxygen is evolved in the positive electrodes, bringing about discharge of the negative electrodes, impeding the process of balancing.

In an exemplary method of manufacturing a HES, removal of the evolved oxygen from the capacitor 1 by vacuumization during its charge makes it possible to effectively balance the Coulombic capacities of the capacitor's positive and negative electrodes. Research makes it possible to establish that the Coulombic capacity ($Q_B$[Ah]) of the process of balancing the electrodes of HES of different designs and different Coulombic capacities is very well characterized by the following formula:

$$Q_B = 1{,}5 Q_N, \quad (3)$$

where $Q_N$[Ah] is the Coulombic capacity of the negative electrodes at the maximum state of charge of the capacitors. For the balancing of the electrodes' capacities it is possible to use different profiles of the charge current, but the balancing by constant current is preferable as it facilitates the formation process and brings about lower overheating of the capacitor. This is particularly important to the balancing of the capacitors of high capacitance. The value of the balancing charge current $I_B$[A] is expressed by the formula:

$$I_B = \frac{Q_B}{t_B}, \quad (4)$$

where $t_B$[h] is duration of balancing process.

The balancing of the Coulombic capacities is performed by $I_B$ current whose value is pre-set in the current source 33 up to its completion. At the final stage of the balancing process, apart from the oxygen evolution in the positive electrode, hydrogen is often evolved in the negative electrode. Both the oxygen and hydrogen are removed from the volume of the capacitor by the process of pumping off gases from the capacitor. This makes it possible to prevent the process of displacement of electrolyte, by hydrogen, from the negative electrodes' pores and provide for an effective balancing of the Coulombic capacities of the capacitor's positive and negative electrodes.

After the completion of balancing the Coulombic capacities of the capacitor with pre-formed positive electrodes, the capacitor is discharged by the balancing current until the capacitor's voltage reaches about 0.7-0.8 V, while continuing to pump gas from the capacitor. Further, the vacuum valve 32 is closed using the air inflow valve 34 and the vacuum chamber (25) is filled with air. As soon as the atmospheric pressure is reached in the chamber 25, the chamber opens and the emergency valve (10) is installed in the capacitor. The capacitor is charged to the optimal voltage, its clamps are disconnected from the connections, and the capacitor is extracted from the vacuum chamber for control testing of its energy, capacity parameters and operation.

EXAMPLES

Example 1

Example 1 is an HES manufactured using an exemplary method of the present invention showing the efficiency of the an exemplary method. FIG. 1a is a capacitor (HES #1) having a $PbO_2|H_2SO_4|C$ system was manufactured with $10_+/11_-$ plate count of positive and negative electrodes. In order to manufacture the HES #1, non-formed plates of the positive electrodes 2 with a dimension of $193\times159\times2.6$ mm$^3$ were used. The total mass and active material mass of 10 non-formed plates of the positive electrodes of the capacitor 1 was 4.0 kg and 2.65 kg respectively. The maximum Coulombic capacity of the plate of the formed positive electrode during 12-hour discharge is 30 Ah.

To manufacture the negative electrodes 11, a carbon plate (3) having an overall dimension of $193\times159\times2.0$ mm$^3$ was used. The total mass of 20 carbon plates of HES #1 was 675 g. The mass density of the dry carbon plates was 0.55 g/cm$^3$. The maximum specific capacitance and Coulombic capacity of the carbon plates during the measurements thereof as components of the capacitor having a $PbO_2|H_2SO_4|C$ system were 660 F/g and 860 C/g respectively.

Lead alloy current collectors containing 3% Sn having a conductive protective coating 12 were used as the current collectors 4 for the negative electrodes. The protective coating was made of chemically stable polymers and carbon powders with high conductivity. The current collectors had an overall dimension of $193\times159\times0.26$ mm$^3$.

The negative electrodes 11 and 14 are made by pasting 15 the carbon plates 3 to the current collectors 4. A conductive adhesive layer 13 of about 5 μm thickness was applied on the surfaces of the protective coating 12 of the current collectors. The carbon plates were pasted by the rolling of the joint current collectors with the carbon plates. The pressure of the cylinder rolls 16 on the carbon plates during rolling was about 0.6 kg/cm$^2$.

An AGM separator of 0.5 mm thickness (at 20 kPa pressure) was used as the separator 5 in this exemplary method. The electrode pack and capacitor were assembled together in the exemplary method stated above. In order to cast the terminals with the jumpers of the positive and negative electrodes, a lead alloy with 5% content of antimony was used.

HES #1 was filled with 1.3 kg of the electrolyte 17 of aqueous solution of sulfuric acid having 1.24 g/cm$^3$ density (at 25° C. temperature). The electrolyte's temperature before the filling in the capacitor was 20° C. The calculated density of the electrolyte after the formation of the positive electrode's plates was 1.26 g/cm$^3$. The capacitor was exposed to the electrolyte for 15 minutes under normal conditions. For the maximum filling of the carbon plates' pores, the capacitor was subjected to vacuumization by the afore-mentioned exemplary method for 20 minutes at a vacuum chamber pressure of 10 mm Hg. After the vacuumization, the capacitor's temperature increased to 42.5° C.

The positive electrodes of the HES #1 were formed in the continuously by a 20 A constant current for 60 hours. The Coulombic capacity of the formation had the value of 1200 Ah. The ambient temperature during the formation changed in the range of 20-21° C.

Figure 7:
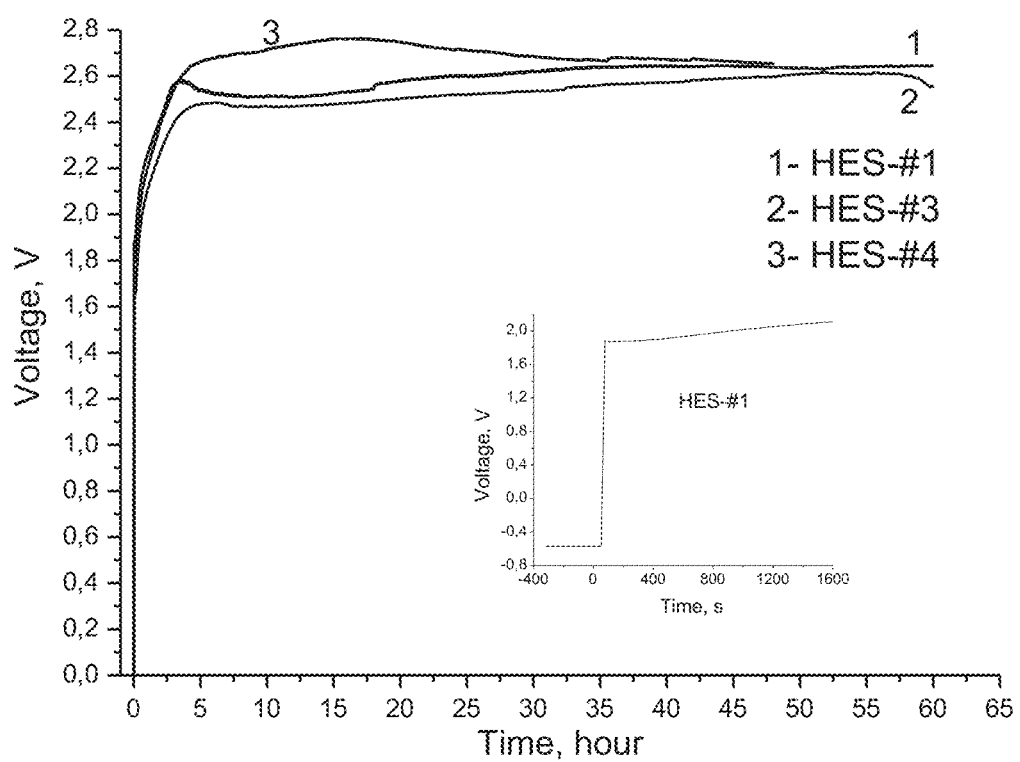
FIG. 7 is an illustration of time dependences of voltages of HES #1, #3 and #4 as described below, during formation of their positive electrodes.

FIG. 7 illustrates the voltage of the HES #1 before the formation process (when there was no formation current) at about minus 0.57 V and when the formation current is switched on increasing in rapidly to the value of about 1.65 V. Further, the voltage of the capacitor increases in a monotonic manner and during 4 hours reaches a value of about 2.6 V. Thereafter, a slight decrease of the voltage occurs and then the voltage increases in a monotonic and slow manner. During the final stage of the formation, the capacitor's voltage does not change and at the end of the formation is 2.65 V.

Figure 8:
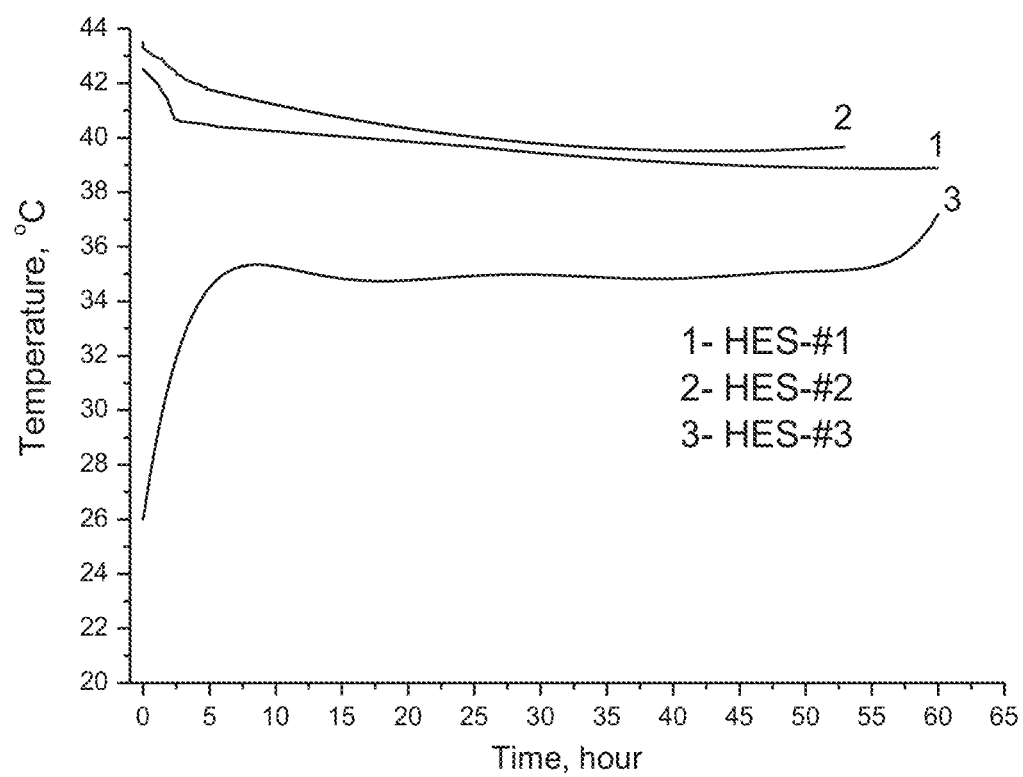
FIG. 8 is an illustration of time dependences of temperature of HES #1, #2 and #3 as described below, during formation of their positive electrodes.

FIG. 8 is a diagram plotting temperature versus time. The temperature of the HES #1 has the maximum value of 42.5° C. before its formation. At the initial stage of formation the capacitor's temperature decreases to 41.5° C. in a rapid manner. Thereafter, as the formation process continues, the capacitor's temperature does not change and remains about 39° C. This example shows that during the formation of the capacitor's positive electrodes its maximum temperature does not exceed 42.5° C., and the average value of the temperature is 39.2° C., making it possible to perform effective formation of the positive electrodes and perform balancing of the Coulombic capacities of the positive and negative electrodes.

After the completion of the formation process of HES #1's positive electrodes, the capacitor was discharged by 15 A constant current to the voltage of about 0.7 V. The maximum values of the discharge energy and Coulombic capacity of the capacitor were 212 Wh and 158 Ah respectively (See Table 1). The maximum capacitance of the capacitor after the formation of the positive electrodes has a value of about 435 kF. Since the maximum value of the specific capacitance of the carbon plates is about 660 F/g and the total mass of the carbon plates in the capacitor is equal to about 675 g, it is clear from the values of the capacitor's capacitance that after the formation the main pores of the carbon plates were fully filled with the electrolyte.

After assembly of the HES #1 its mass, without electrolyte, was 6.2 kg, and after the addition of the electrolyte and the positive electrodes' formation the mass was about 7.5 kg, the maximum specific energy of the capacitor has the value of about 28.2 Wh/kg by mass.

The density of the capacitor's electrolyte after its formation showed an increased to 1.261 g/cm$^3$ (at T=25° C.) that is well in line with the estimate value of the density (1.26 g/cm$^3$).

After the discharging the HES #1 down to a voltage of 0.7 V in order to seal the capacitor, an emergency valve was fixed in the capacitor. Thereafter, testing was performed of the energy and capacity parameters of the sealed HES #1 at an ambient temperature of 25° C. and in different modes of charge and discharge. The values of charge ($I_{ch}$) and discharge ($I_{dis}$) currents, charge ($Q_{ch}$) and discharge ($Q_{dis}$) Coulombic capacity, discharge energy ($E_{dis}$), and voltage of the HES #1 at the end of the charge ($U_{ech}$) are shown in Table 2. In all the testing modes, the capacitor is discharged to the voltage of 0.8 V.

As the state of charge of the HES #1 increases from 95 Ah to 150 Ah, the voltage $U_{edis}$ increases from about 2.281 V to 2.362 V (Table 2). The slow increase in the voltage of the HES at its high state of charge (as it was shown above) is related to an increase of the negative electrode's capacitance, a heavy shift of its potential toward the negative area of the potentials. It follows from FIG. 9, that at low values of the state of charge the capacitors' voltages increase linearly. Furthermore, along with an increase of the state of charge, the voltage's increase slows.

Example 2

Example 2 is another exemplary method of the present invention where a capacitor, HES #2, was manufactured having the same dimensions of the positive and negative electrodes and design of the capacitor shown in Example 1. The filling of the capacitor with electrolyte is performed by the method shown in Example 1. The positive electrodes of the HES #2 were formed by 22.5 A constant current for 53 hours.

The voltage of HES #2 changes during the formation similarly to the voltage change of HES #1. FIG. 8 indicates that the temperature of HES #2 at the start of formation is about 43.5°

C. Unlike the temperature change of HES #1, the temperature change of HES #2 at the initial stage of formation decreases slower. At the final stage of formation, there occurs a slight increase in temperature, and the average value of the capacitor's temperature during the formation is 40.1° C. HES #2 has a higher average value of the temperature as compared to the average temperature of HES #1, because of the higher formation current 22.5 A.

The maximum capacitance of HES #2 is 447 kF as shown in Table 1. HES #2 has a higher value of capacitance as compared to the capacitance 435 kF of HES #1. The high temperature improves the wettability of the carbon plates by the electrolyte resulting in elevated values of the capacitor's capacitance.

Figure 9:
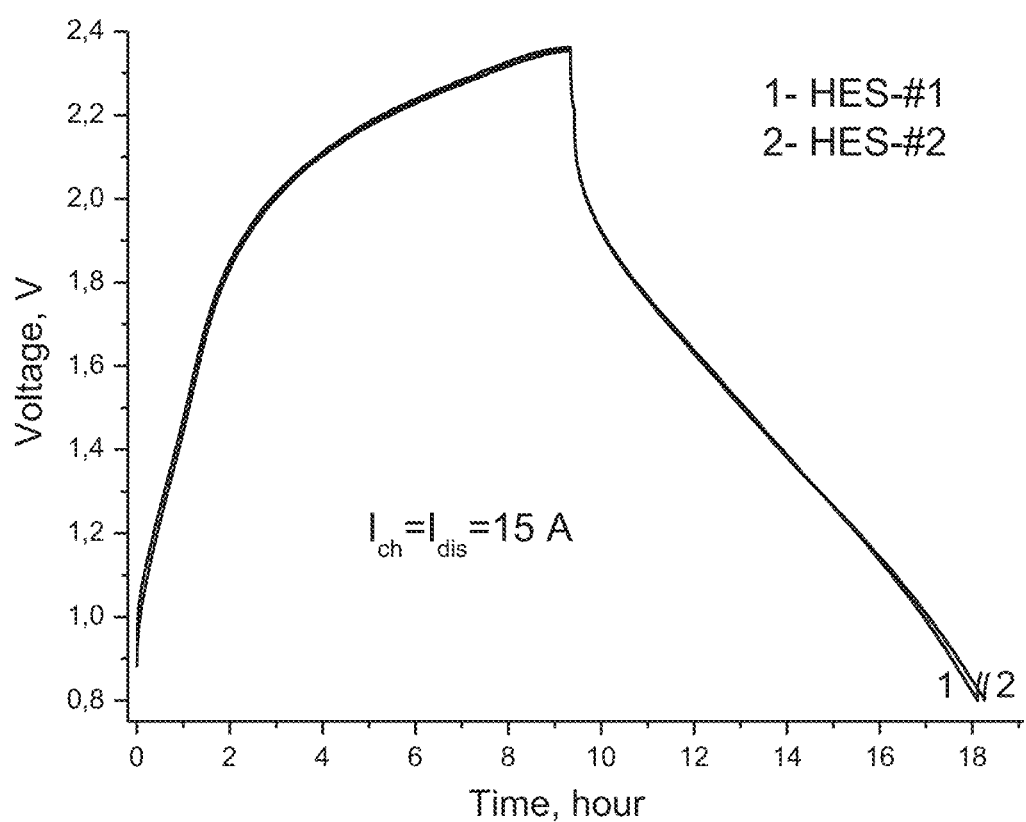
FIG. 9 is an illustration of time dependences of voltages of HES #1 and #2 as described below, during charge and discharge by 15 A constant current with 140 Ah Coulombic charge capacity at 25° C. temperature.

The maximum discharge energy and Coulombic capacity of HES #2 are 218 Wh and 162 Ah respectively, and has a maximum specific energy of 29.1 Wh/kg. Testing of the energy and capacity parameters in different modes of charge and discharge shows that the discharge energy and Coulombic capacity of HES #2 have higher values than those of HES #1, as recorded in Table 2. The higher capacity parameters of HES #2 also become clear from looking at the time dependence of the voltage during its charge and discharge by 15 A constant current as seen in FIG. 9.

Example 3

Example 3 is another exemplary method wherein a capacitor, HES #3, was manufactured with the same dimensions of positive and negative electrodes of the capacitor design shown in Example 1. Before, HES #3, was filled with electrolyte, the electrolyte was cooled to a temperature of about minus 25° C. The electrolyte had a density of about 1.24 g/cm$^3$. Further, the capacitor was slowly filled with electrolyte and left to expose for 15 minutes. Then the capacitor was vacuumized. The pressure in the vacuum chamber was about 10 mm Hg and the duration of the vacuumization process was about 20 minutes. The capacitor's temperature after the vacuumization increased to 26° C.

At the start of the formation process, the positive electrodes were polarized toward the negative area of the potentials by a 20 A current and the negative electrodes polarized toward the positive area to recover the oxide layers on the surfaces of the positive electrodes' grids. After 10 minutes, the current's direction was changed, and the positive electrodes were continuously formed by the assigned 20 A current over 60 hours.

FIG. 7 shows the voltage of HES #3 during the formation was lower than the voltage of HES #1 and HES #4. At the end of the formation process there was a slight decrease of the voltage relating to the increase in temperature. FIG. 8 shows the temperature of HES #3 at the initial stage of formation increases slowly to 35° C. Further, with an increase of the formation time, the temperature's change is insignificant and at the final stage of formation the temperature increases to 37.2° C. The capacitor's average temperature during the formation was 34.7° C.

The capacitance of HES #3 is 430 kF, and the maximum value of the discharge energy and Coulombic capacity are 210 Wh and 156 Ah respectively, as shown in Table 1. Testing of the energy and capacity parameters of HES #3 show the capacitor has high energy and capacity parameters as seen in Table 2. The use of a cold electrolyte maintains a colder average temperature of the capacitor during formation, and the positive electrodes are formed effectively. The use of a cold electrolyte will make it possible to considerably decrease the time of formation of positive electrodes of a high capacitance HES.

Example 4

Example 4 is another exemplary method wherein a capacitor, HES #4, was manufactured with the same dimensions of the positive and negative electrodes and design of the capacitor specified in Example 1. The electrolyte has a density of about 1.24 g/cm3 and was added to the capacitor in the same manner as Example 1. The positive electrodes of HES #4 were formed by a 25 A constant current over 48 hours. In the course of the formation process, the capacitor's temperature was forcibly and uniformly maintained at about 25° C.

FIG. 7 shows that the voltage of HES #4 during the formation increases slowly and after 18 hours reaches about 2.76 V; then a slight voltage drop takes place. At the end of the formation, the capacitor's voltage is about 2.66 V.

The capacitance of HES #4 is 426 kF, and the maximum discharge energy and Coulombic capacity are 208 Wh and 154 Ah respectively, as shown in Table 1. The reduced values of capacitance and discharge energy of HES #4 as compared to the same parameters of HES #1, #2 and #3, shown in Table 2, is mostly related to the reduced temperature during the capacitor's formation.

Example 5

Example 5 is another exemplary method wherein a capacitor, HES #5, was manufactured with a 10$_+$/11$_-$ positive and negative electrode plate count and having the same design shown in FIG. 1a. To manufacture HES #5, non-formed plates of the positive electrodes with 207×172×2.38 mm$^3$ overall dimensions were used. The total mass of 10 non-formed plates of positive electrodes and their active materials had values of 4.6 kg and 2.84 kg respectively. The maximum Coulombic capacity of the formed positive electrode during a 20 hour discharge was 32.6 Ah.

The carbon plates of the negative electrodes had dimensions of about 207×172×2.2 mm$^3$. The total mass of 20 carbon plates in the HES #5 was 970 g. The maximum specific capacitance and Coulombic capacity of the carbon plates having a 0.65 g/cm$^3$ density was about 795 F/g and 1040 C/g respectively.

The current collectors of the negative electrodes had a similar design of the current collector found in HES #1 and overall dimensions of 207×172×0.26 mm$^3$. The negative electrodes were made according to the manufacturing methods found in HES #1. An AGM separator of 0.5 mm thickness was used. The assembly of HES #5 was performed similar to the assembly of HES #1. The mass of HES #5 without the electrolyte was about 7.4 kg.

After assembly, HES #5 was filled with approximately 1.95 kg of aqueous sulfuric acid electrolyte having a density of about 1.23 g/cm$^3$ at 25° C. The electrolyte's temperature before addition to the capacitor was 20° C. After 15 minutes of exposure under normal conditions, the capacitor was vacuumized for 20 minutes at a pressure of 10 mm Hg. After the electrolyte addition and vacuumization, the capacitor's temperature was about 38.2° C.

The formation of the positive electrodes of HES #5 was performed by a 20 A constant current. The formation Coulombic capacity was 1280 Ah and duration of 64 hours.

Figure 10:
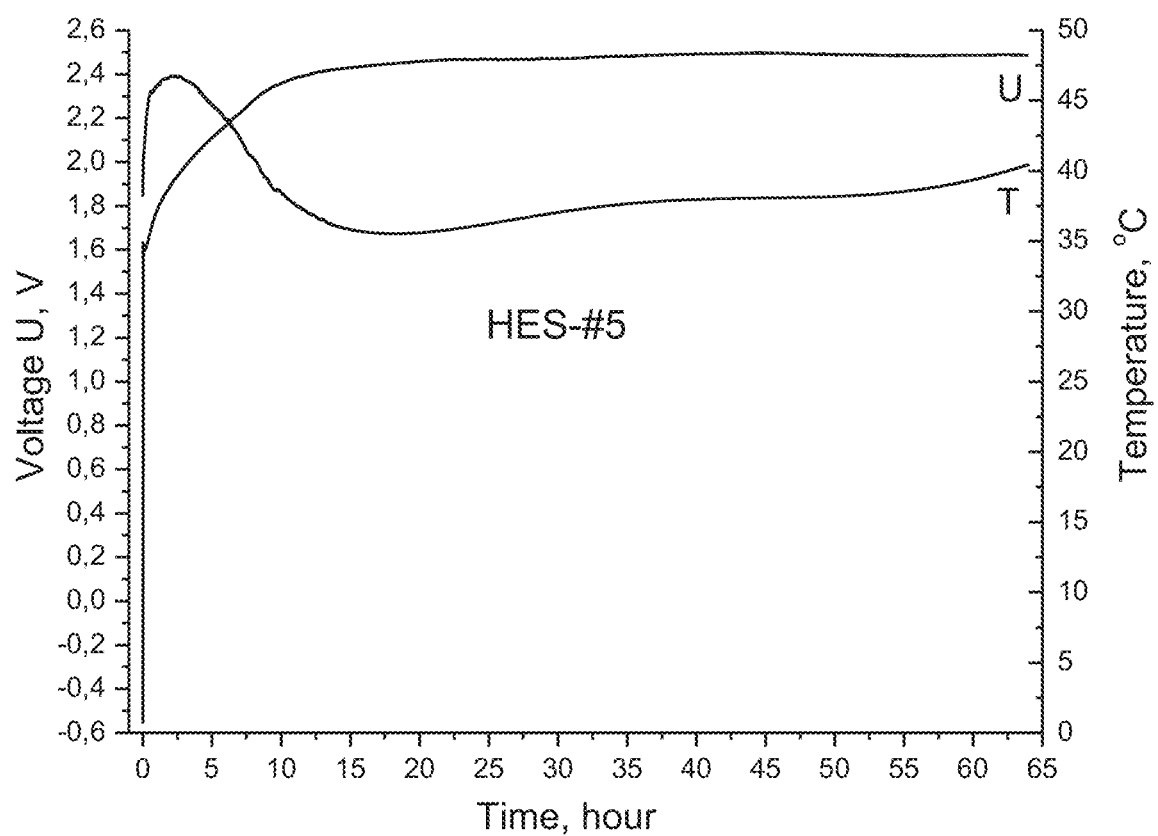
FIG. 10 is an illustration of time dependence of voltage (U) and temperature (T) of HES #5 as described below, during formation of its positive electrodes.

FIG. 10 shows that at the initial stage of formation the capacitor's temperature increases fast and after 2.5 hours reaches a maximum of 46.6° C. Thereafter, during the course of formation, the temperature of HES #5 decreased to about 35.5° C. and then slowly increased until the end of the formation process. At the end stage of the formation phase the rate of temperature rise increases, and at the end of formation the capacitor's temperature reaches 40.4° C. During the capacitor's formation its average temperature was 38.5° C. at an average ambient temperature of 21.9° C.

The voltage of HES #5 immediately after the addition of electrolyte and vacuumization had a value of about minus 0.558 V, and after the formation current was turned off it increased unevenly to about 1.58 V, as shown in FIG. 10. Then the capacitor's voltage increases in a monotonic manner and after 10 hours reaches a value of about 2.4 V. After 10 hours, the increase of the capacitor's voltage gradually slows as the formation continues. At the end of the formation process the capacitor's voltage is about 2.488 V.

The density of the HES #5 electrolyte immediately after the formation of the positive electrodes was about 1.3 g/cm3 (at T=25° C.). Immediately after the completion of the formation process, the capacitor was discharged by a 20 A constant current to the voltage of 0.7 V. Then the capacitor was sealed. The maximum values of the discharge energy and Coulombic capacity of HES #5 were 382 Wh and 280 Ah respectively; the maximum capacitance was about 770 kF, as shown in Table 1. The maximum specific energy, by mass, of the capacitor was about 41.0 Wh/kg.

The energy and capacity parameters of HES #5 were tested in three different modes of charge and discharge at 25° C. ambient temperature. The capacitor was charged and discharged by a 25 A constant current with 125 Ah, 175 Ah and 250 Ah charge Coulombic capacity. In all the modes, the capacitor was discharged to the voltage of 0.8 V. The energy and capacity parameters of HES #5 are shown in Table 2. At the values of 125 Ah, 175 Ah and 250 Ah of the charge Coulombic capacity the specific discharge energy of the capacitor was 18.4 Wh/kg, 25.8 Wh/kg and 34.3 Wh/kg respectively.

Figure 11:
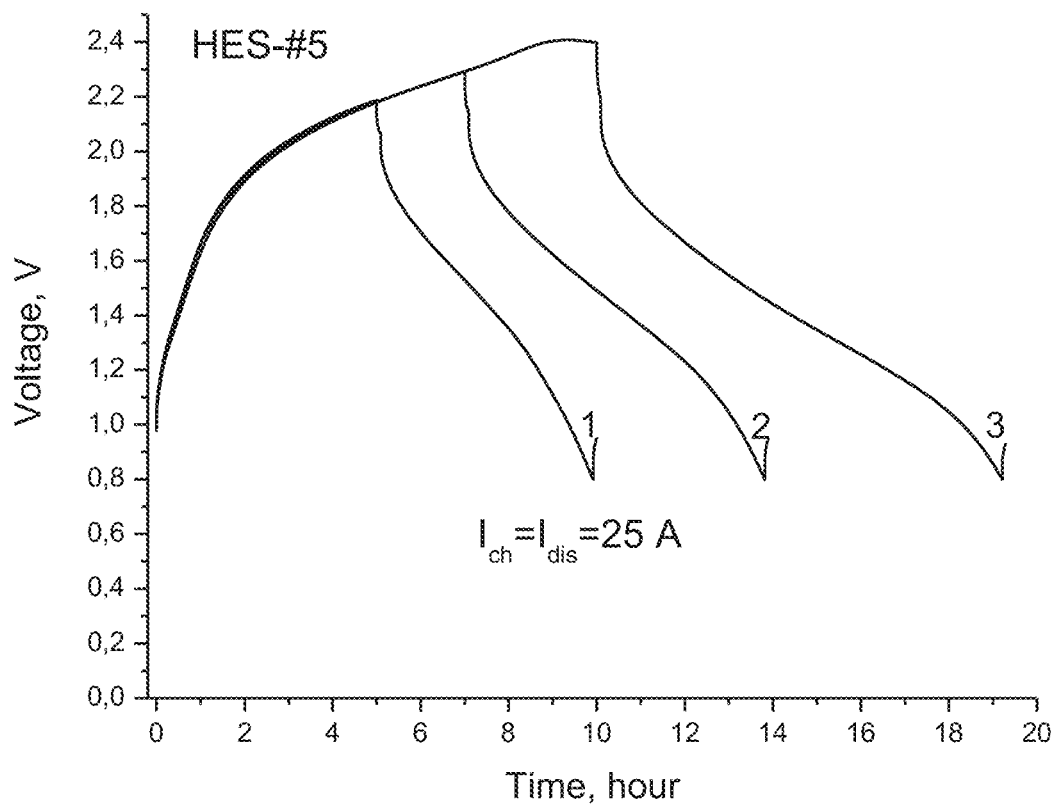
FIG. 11 is an illustration of time dependence of voltage of HES #5 as described below, during charge and discharge by 25 A constant current with the Coulombic charge capacity of 125 Ah (1), 175 Ah (2) and 250 Ah (3) at 25° C. temperature.

It follows from FIG. 11 that at the charge Coulombic capacity of 125 Ah, 175 Ah and 250 Ah the parameters of the time dependence of the voltage of HES #5 are not different from the parameters of the time dependence of HES #1 and #2, as shown in FIG. 9. We should note that during testing with the charge Coulombic capacity of 250 Ah, a slight decrease of the voltage of HES #5 during the final stage of the charge process occurred, as shown in FIG. 11. This is related to the fact that at a high state of the capacitor's charge an increase of its temperature takes place. Since an increase of the capacitor's temperature results in a decrease of the internal resistance, the overpotentials of evolution of hydrogen of the negative electrode and oxygen of the positive electrode, and a slight decrease of the voltage takes place along with an increase of the capacitor's temperature.

Example 6

Example 6 is another exemplary method of the present invention. To show the efficiency of the proposed exemplary manufacturing method of HES with pre-formed positive electrodes, a capacitor was manufactured, HES#6, with $10_+/11_-$ positive and negative electrode plate count and having the design shown in FIG. 1a. The formed positive electrodes 2 have a dimension of about 185×170×2.1 mm³. The total mass of 10 plates of the positive electrodes of the capacitor 1 was about 3.8 kg. The maximum Coulombic capacity of the positive electrode during a 20 hour discharge was about 25 Ah.

The negative electrodes were made of carbon plates 3 with an overall dimension of 185×170×2.0 mm³ and current collectors 4 with an overall dimension of about 185×170×0.26 mm³. The current collectors had a protective coating 12 and negative electrodes 11 and 14 were manufactured as per the method described in Example 1.

The mass density of the dry carbon plates of HES #6 were about 0.53 g/cm³ and the total mass of 20 carbon plates was about 650 g. The maximum specific energy and Coulombic capacity of the carbon plates were about 615 F/g and 803 C/g respectively.

An AGM separator of 0.5 mm thickness (at 20 kPa pressure) was used as the separator 5. The assembly of HES #6 was performed by the exemplary method used to construct HES #1, shown in Example 1. The mass of HES #6 without the electrolyte was about 5.95 kg.

HES #6 was filled with 1.15 kg electrolyte 17 of sulfuric acid aqueous solution having a density of about 1.26 g/cm³ at 25° C. temperature. After 30 minutes of exposure under normal conditions, the capacitor was placed in the vacuum chamber 25 of the installation 26, shown in FIG. 7. The capacitor was vacuumized for 30 minutes. The pressure in the vacuum chamber was about 10 mm Hg. Following the vacuumization, the capacitor's temperature increased to about 26.5° C.

The current clamps 9 of the capacitor were connected to the sealed connectors 27 and 28 as shown in FIG. 7. The poles of the current source 33 were connected to the connectors 27 and 28 as shown in FIG. 7. The balancing of the Coulombic capacities of the positive and negative electrodes of HES #6 was performed by a 14 A constant current for 15.5 hours while the vacuum chamber was continuously pumped off. After the balancing current was switched on, the gases' pressure in the vacuum chamber increased to 15 mm Hg after 25 minutes. After 50 minutes, the pressure was decreasing to 10 mm Hg and remained unchanged until the end of the balancing process.

Figure 12:
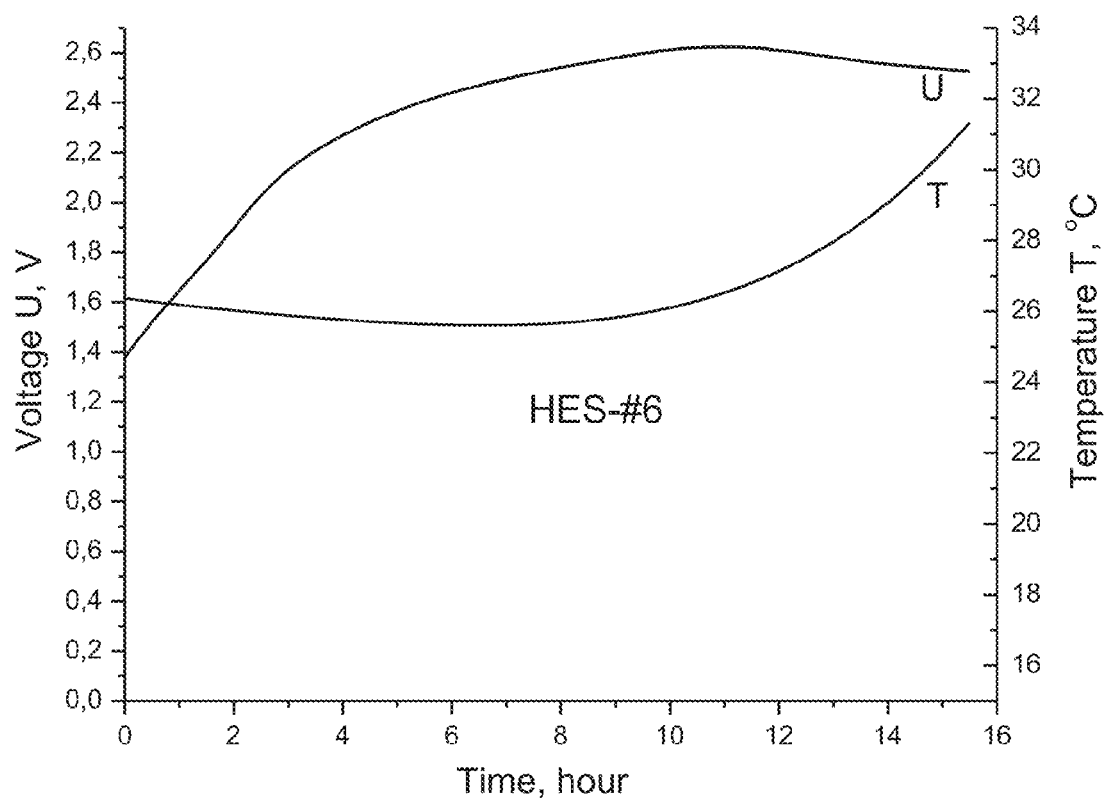
FIG. 12 is an illustration of time dependence of voltage (U) and temperature (T) of HES #6 as described below, during the balancing of the Coulombic capacities of the positive and negative electrodes.

As shown in FIG. 12, the voltage of HES #6 was about 1.376 V before the balancing current was switched on, and the temperature was about 26.5° C. While an increase in the time required for balancing the capacitor's voltage ($U_C$) increases in a monotonic manner, the temperature ($T_C$) decreases insignificantly. Further, after 11 hours of balancing the capacitor, the value $U_C$ reaches its maximum value of about 2.62 V; then decreases in a monotonic manner until the end of the balancing process. At the end of the balancing process the $U_C$ is about 2.53 V. A decrease of the capacitor's voltage at the final stage of the balancing process is related to an increase of its temperature. When the negative electrodes of the capacitor are fully charged, there occurs an abrupt increase in the evolution of hydrogen and heat that results in a fast increase in the capacitor's temperature, as shown in FIG. 12. At the end of the balancing process the temperature of HES #6 was about 31.9° C.

The maximum voltage of a HES during the balancing of the capacities of the positive and negative electrodes is mostly related to the rate of the removal of gases from the capacitor, the balancing current used, overall dimensions of the electrodes, and the value of the capacitance of the capacitor. According to exemplary manufacturing methods of the present invention, the Coulombic capacities of the positive and negative electrodes of a HES with pre-formed positive electrodes are effectively balanced when the Coulombic balancing capacity, after maximum voltage of the capacitor is obtained, is not less than 10% of the Coulombic balancing capacity before obtaining the maximum value of the capacitors' voltages. In the case of balancing the capacities of the electrodes of a capacitor having two or more plates of the positive electrodes, apart from the balancing of the electrodes' capacities, the balancing process brings about a maximum leveling of the state of charge of all the plates of the positive electrodes. This increases the stability of the energy, capacity parameters, cycle life, and reliability of the capacitor's operation.

Since the positive electrodes of the capacitor are pre-formed there is no risk of active material sulfation during extended exposure in the electrolyte and the duration of the balancing process may be increased. However, extending the balancing process increases cost and manufacturing time of the capacitors. Therefore, the optimal duration of the balancing process is selected to ensure that during the balancing the capacitor's temperature does not exceed about 50° C. Usually the optimal duration of the balancing process of HES electrodes with a capacitance of up to 400 kF does not exceed 16 hours and capacitances between 400 kF and 800 kF do not exceed 20 hours.

The discharge of HES #6 by a 14 A current to a voltage of about 0.7 V, immediately after the balancing process, indicated that the maximum capacity and maximum discharge energy have values of 145 Ah and 194 Wh respectively. The maximum capacitance of the capacitor is 398 kF, as shown in Table 1; this indicates that the capacitor's negative electrodes during balancing are fully charged. The mass of HES #6 before electrolyte addition was about 6.0 kg and after the electrolyte addition and balancing about 7.1 kg. The maximum specific (by mass) energy of the capacitor has a value of about 27.3 Wh/kg.

After the discharge of HES #6 to a voltage of 0.7 V and affixing an emergency valve, the energy and capacity parameters were tested at an ambient temperature of about 25° C. The capacitor was charged and discharged by a 13 A constant current in three different modes. The value of the charge Coulombic capacity of the first, second and third modes was 75 Ah, 100 Ah and 110 Ah respectively. In all the modes the capacitor was discharged to the voltage of 0.8 V. The energy and capacity parameters of HES #6 are shown in Table 2.

Figure 13:
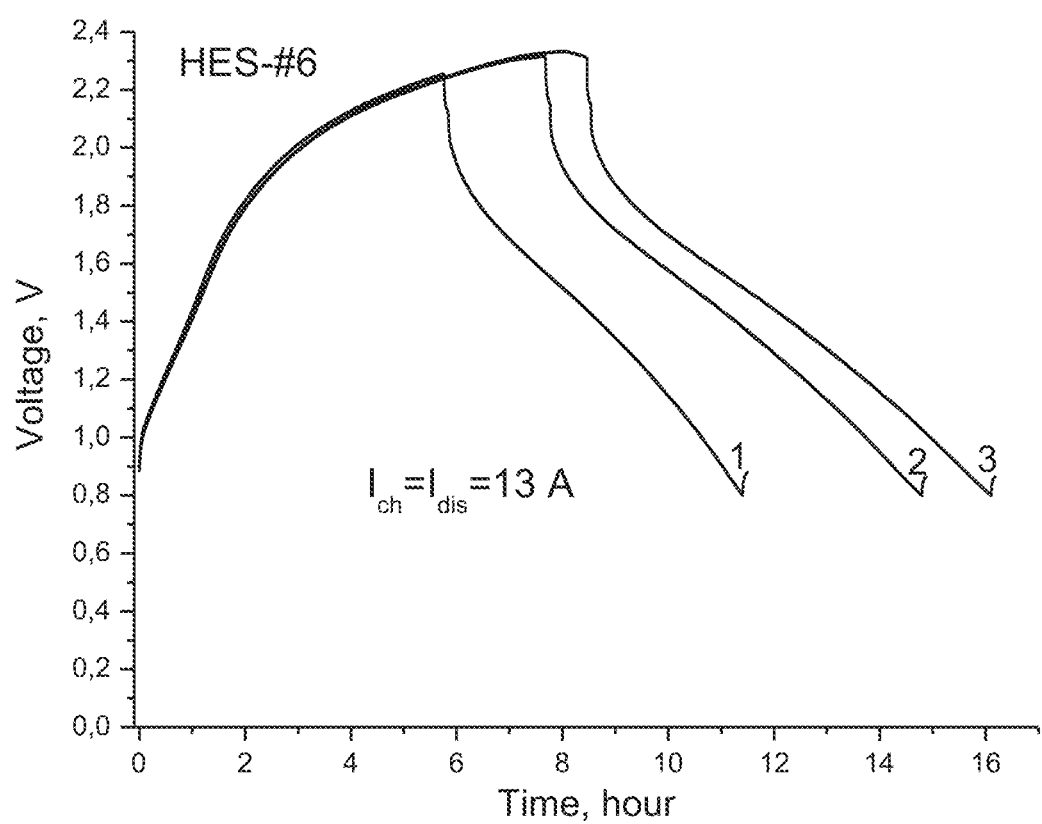
FIG. 13 is an illustration of time dependence of voltage of HES #6 during charge and discharge by 13 A constant current with the Coulombic charge capacity of 75 Ah (1), 100 Ah (2) and 110 Ah (3) at 25° C. temperature.

At the charge Coulombic capacity of 75 Ah, 100 Ah and 110 Ah, the pattern of the time dependence of the voltage of HES #6 are different from the patterns of the time dependences of HES #1 and #2 (FIGS. 13 and 9). FIG. 13 indicates that during testing with the charge Coulombic capacity of 110 Ah, at the end of the charge process there is a slight decrease of the voltage of HES #6 which is a result of the increase in the capacitor's temperature at the final stage of the charge process.

The exemplary embodiments described are given by example and should not be used to limit the present invention. It is understood by one skilled in the art may manufacture a HES with different dimensions and configurations of the positive and negative electrodes and capacitors. The capacitors may be manufactured with the capacitance from several millifarads to several megafarads. During the formation of the positive electrodes or balancing of the Coulombic capacities of the positive and negative electrodes, constant current may be used whose value changes in a different way during these processes.

TABLE 1

Maximum energy, capacity parameters of a HES and parameters of the positive electrodes formation modes.

| Maximum parameters of capacitors | HES-#1 | HES-#2 | HES-#3 | HES-#4 | HES-#5 | HES-#6 |
|---|---|---|---|---|---|---|
| Capacitance, kF | 435 | 447 | 430 | 426 | 770 | 398 |
| Coulombic capacity (during discharge to 0.7 V), Ah | 158 | 162 | 156 | 154 | 280 | 145 |
| Discharge energy (during discharge to 0.7 V), Wh | 212 | 218 | 210 | 208 | 382 | 194 |
| Discharge energy (during discharge to 0.8 V), Wh | 203 | 208 | 201 | 199 | 368 | 186 |
| Specific (by mass) energy, Wh/kg | 28.2 | 29.1 | 28.0 | 27.7 | 41.0 | 27.3 |
| Specific (by volume) energy, Wh/l | 54.8 | 56.3 | 54.3 | 53.7 | 89.2 | 52.4 |
| Formation current (balancing), A | 20 | 22.5 | 20 | 25 | 20 | 14 |
| Formation time (balancing), hour | 60 | 53 | 60 | 48 | 64 | 15.5 |
| Volume, l | 3.87 | 3.87 | 3.87 | 3.87 | 4.28 | 3.71 |
| Mass, kg | 7.5 | 7.5 | 7.5 | 7.5 | 9.3 | 7.1 |

TABLE 2

Energy and capacity parameters of a HES in the different modes of charge and discharge at 25° C. temperature.

| Capacitors | $I_{ch}$, A | $I_{dis}$, A | $Q_{ch}$, Ah | $Q_{dis}$, Ah | $E_{dis}$, Wh | $U_{ech}$, V |
|---|---|---|---|---|---|---|
| HES-#1 | 15 | 15 | 95 | 90.7 | 131.6 | 2.281 |
|  | 15 | 15 | 140 | 130.2 | 184.4 | 2.358 |
|  | 15 | 15 | 150 | 137.4 | 193.4 | 2.362 |
| HES-#2 | 15 | 15 | 95 | 93.2 | 135.8 | 2.278 |
|  | 15 | 15 | 140 | 132.8 | 189.5 | 2.352 |
|  | 15 | 15 | 150 | 140.3 | 194.7 | 2.358 |
| HES-#3 | 15 | 15 | 95 | 89.8 | 130.2 | 2.285 |
|  | 15 | 15 | 140 | 129.1 | 182.3 | 2.362 |
|  | 15 | 15 | 150 | 135.8 | 191.1 | 2.367 |
| HES-#4 | 15 | 15 | 95 | 89.3 | 128.9 | 2.287 |
|  | 15 | 15 | 140 | 127.8 | 180.6 | 2.364 |
|  | 15 | 15 | 150 | 134.5 | 189.4 | 2.369 |
| HES-#5 | 25 | 25 | 125 | 120.6 | 171.1 | 2.187 |
|  | 25 | 25 | 175 | 168.5 | 240.1 | 2.291 |
|  | 25 | 25 | 250 | 228.5 | 318.6 | 2.396 |
| HES-#6 | 13 | 13 | 75 | 73.3 | 104.2 | 2.253 |
|  | 13 | 13 | 100 | 92.5 | 130.4 | 2.315 |
|  | 13 | 13 | 110 | 98.4 | 137.3 | 2.313 |

What is claimed is:

1. A method of manufacturing a heterogeneous electrochemical capacitor with a double electric layer, the capacitor having at least one polarizable negative electrode comprising activated carbon materials, at least one non-polarizable positive electrode, an electrolyte of sulfuric acid aqueous solution, and a porous separator that electronically separates the positive and negative electrodes, the method comprising:

placing a pre-formed negative polarizable electrode in a case;

placing a non-formed positive electrode in the case, the non-formed active material of the positive electrode comprising lead and lead sulfate ($PbSO_4$);

causing the formation of the active material of the non-formed positive electrode after the positive electrode is placed in the case, by passing an electric current through the capacitor so as to produce an electrochemical oxidation of the positive electrode active material; and balancing the Coulombic capacities of the positive and negative electrodes;

wherein, after formation, the active material of the positive electrode is comprised of lead dioxide obtained only by electrochemical oxidation of lead and its combinations, and lead sulfate.

2. The method according to claim 1, wherein the capacitor includes at least one non-polarizable positive electrode plate and at least one negative polarizable electrode plate, and wherein the porous separator electronically separates the plates of the positive and negative electrodes.

3. The method according to claim 1, wherein the active material of the non-formed positive is comprised of a mixture of lead, lead oxide (PbO), red lead ($Pb_3O_4$) and lead sulfate ($PbSO_4$), which may occur in different combinations with different mass ratios of the components.

4. The method according to claim 2, wherein the active material of the negative electrode is a carbon material which is bonded to its current collector with conductive glue.

5. The method according to claim 1, wherein the capacitor is filled with the sulfuric acid electrolyte with a temperature in the range of minus 35° C.-plus 30° C.

6. The method according to claim 5, wherein the density of the electrolyte before its addition to the capacitor is not lower than 1.1 g/cm$^3$.

7. The method according to claim 6, wherein after the electrolyte is added to the capacitor, a preliminary wetting of the electrodes and separator by the electrolyte is performed.

8. The method according to claim 7, wherein the duration of the preliminary wetting is 10-30 minutes.

9. The method according to claim 7, wherein after a preliminary wetting of the electrodes and separator by the electrolyte, the case is evacuated in a vacuum chamber.

10. The method according to claim 9, wherein the electric current is passed through the capacitor after the case is evacuated.

11. The method according to claim 9, wherein the duration of the evacuation process is between 15-30 minutes.

12. The method according to claim 11, wherein the vacuum chamber pressure is between 5-150 mm Hg.

13. The method according to claim 1, wherein the electric current is a constant current or a constant current with different profiles.

14. The method according to claim 13, wherein the duration of formation of the positive electrode active material is determined from the total mass of the active material and the formation current.

15. The method according to claim 14, wherein the duration of the positive electrode formation process is not more than 70 hours.

16. The method according to claim 1, wherein forced cooling of the capacitor is employed during formation of the positive electrode.

17. The method according to claim 1, wherein at the start of formation of the positive electrode, the potentials thereof are polarized toward the negative values during a time period of not more than 40 minutes.

18. The method according to claim 15, wherein after formation of the positive electrode, the capacitor is discharged to a voltage of not lower than 0.7 V and then sealed.

19. A method of manufacturing a heterogeneous electrochemical capacitor with a double electric layer, the capacitor having at least one polarizable negative electrode comprising activated carbon materials, at least one non-polarizable positive electrode, an electrolyte of sulfuric acid aqueous solution, and a porous separator that electronically separates the positive and negative electrodes, the method comprising:
   placing a pre-formed negative polarizable electrode in the case;
   placing a non-formed positive electrode in the case, the non-formed active material of the positive electrode comprising lead and lead sulfate ($PbSO_4$);
   causing the formation of the active material of the non-formed positive electrode after the positive electrode is placed in the case, by passing an electric current through the capacitor so as to produce an electrochemical oxidation of the active material thereof;
   filling the case with the sulfuric acid aqueous solution electrolyte;
   evacuating the case; and
   balancing the Coulombic capacities of the positive and negative electrodes;
   wherein, after formation, the active material of the positive electrode is comprised of lead dioxide obtained only by electrochemical oxidation of lead and its combinations, and lead sulfate.

20. The method according to claim 1, wherein the active material of the non-formed positive electrode also contains lead oxide (PbO), red lead ($Pb_3O_4$).

21. The method according to claim 19, wherein the the case is filled with electrolyte at a temperature of not higher than 35° C.

22. The method according to claim 21, wherein after filling of the case with the electrolyte, a preliminary wetting of the electrodes and separator by the electrolyte is performed.

23. The method according to claim 22, wherein the duration of the preliminary wetting of the electrodes and separator is not less than 5 minutes.

24. The method according to claim 22, wherein after the preliminary wetting of the electrodes and separator by the electrolyte, the case is evacuated in a vacuum chamber.

25. The method according to claim 24, wherein the duration of evacuation is not less than 15 minutes.

26. The method according to claim 25, wherein the vacuum chamber pressure is between 5-150 mm Hg.

27. The method according to claim 19, wherein balancing of the Coulombic capacities of the electrodes is performed by a constant current or a constant current with different profiles.

28. The method according to claim 19, wherein the duration of Coulombic balancing is determined by the aggregate Coulombic capacity of the negative electrode and the balancing current.

29. The method according to claim 19, wherein forced cooling is used during Coulombic balancing.

30. The method according to claim 24, wherein a continuous evacuation of gases occurs during the Coulombic balancing process.

31. The method according to claim 19, wherein after the Coulombic balancing of the electrodes, the capacitor is discharged to a voltage in the range of 0.8-0.7 V, and the capacitor is sealed.

32. The method according to claim 24, wherein the vacuum chamber pressure is between 5-250 mm Hg.

33. The method according to claim 19, wherein the electrolyte has a density that does not exceed 1.35 g/cm$^3$ at a temperature of 25° C. when the capacitor is maximally charged.

34. A method of manufacturing a heterogeneous electrochemical capacitor with a double electric layer, the capacitor having a plurality of polarizable negative electrodes comprising activated carbon materials, a plurality of non-polarizable positive electrodes, an electrolyte of sulfuric acid aqueous solution, and a porous separator that electronically separates the positive and negative electrodes, the method comprising:
   placing pre-formed negative polarizable electrodes in the case;

placing non-formed positive electrodes in the case, the non-formed active material of the positive electrodes comprising lead and lead sulfate ($PbSO_4$);

causing the formation of the active material of the non-formed positive electrodes after the positive electrodes are placed in the case, by passing an electric current through the capacitor so as to produce an electrochemical oxidation of the active material of the positive electrodes;

filling the case with the sulfuric acid aqueous solution electrolyte;

evacuating the case;

balancing the Coulombic capacities of the positive and negative electrodes; and discharging the capacitor until the voltage thereof reaches between about 0.7-0.8 volts;

wherein, after formation, the active material of the positive electrodes is comprised of lead dioxide obtained only by electrochemical oxidation of lead and its combinations, and lead sulfate.

35. The method according to claim 34, wherein after filling of the case with the electrolyte, a preliminary wetting of the electrodes and separator by the electrolyte is performed and the case is subsequently evacuated in a vacuum chamber.

36. The method according to claim 35, wherein the duration of evacuation is not less than 15 minutes and the pressure of gases in the vacuum chamber is between about 5-150 mm Hg.

37. The method according to claim 34, wherein:
balancing of the Coulombic capacities of the electrodes is performed by a constant current or a constant current with different profiles;
the duration of Coulombic balancing is determined by the aggregate Coulombic capacity of the negative electrodes and the balancing current; and
a continuous evacuation of gases occurs during the Coulombic balancing process.

* * * * *